United States Patent
Lam et al.

(10) Patent No.: US 11,802,655 B2
(45) Date of Patent: Oct. 31, 2023

(54) DISPLAY PANEL MOUNTING SYSTEMS

(71) Applicant: Peerless Industries, Inc., Aurora, IL (US)

(72) Inventors: Derrik Lam, Chicago, IL (US); Richard Kahn, Chicago, IL (US)

(73) Assignee: PEERLESS INDUSTRIES, INC., Aurora, IL (US)

( * ) Notice: Subject to any disclaimer, the term of this patent is extended or adjusted under 35 U.S.C. 154(b) by 0 days.

(21) Appl. No.: 17/796,924

(22) PCT Filed: Feb. 4, 2021

(86) PCT No.: PCT/US2021/016534
§ 371 (c)(1),
(2) Date: Aug. 2, 2022

(87) PCT Pub. No.: WO2021/158735
PCT Pub. Date: Aug. 12, 2021

(65) Prior Publication Data
US 2023/0057170 A1    Feb. 23, 2023

Related U.S. Application Data

(60) Provisional application No. 62/971,547, filed on Feb. 7, 2020.

(51) Int. Cl.
*F16M 13/02* (2006.01)
*F16M 11/04* (2006.01)
*F16B 5/06* (2006.01)

(52) U.S. Cl.
CPC ........... *F16M 13/02* (2013.01); *F16B 5/0628* (2013.01); *F16B 5/0657* (2013.01); *F16M 11/04* (2013.01)

(58) Field of Classification Search
CPC .... F16B 5/0233; F16B 5/0225; F16B 5/0216; F16B 5/025; F16B 5/0275; F16B 5/0283;
(Continued)

(56) References Cited

U.S. PATENT DOCUMENTS

| | | | |
|---|---|---|---|
| 9,333,779 B2* | 5/2016 | Komiya | B41J 11/20 |
| 2002/0018693 A1* | 2/2002 | Schwarzbich | F16B 5/0233 403/374.4 |

(Continued)

FOREIGN PATENT DOCUMENTS

| | | |
|---|---|---|
| CN | 1574528 A | 2/2005 |
| CN | 109716423 A | 5/2013 |

(Continued)

OTHER PUBLICATIONS

International Search Report and Written Opinion issue for PCT Application No. PCT/US2021/016534 dated Apr. 12, 2021, 12 pages.
(Continued)

*Primary Examiner* — Lee A Holly
(74) *Attorney, Agent, or Firm* — Foley & Lardner LLP

(57) ABSTRACT

A display panel mounting system includes a plate and an adjustment device. The plate includes a plate opening. The adjustment device includes a body, a sleeve, a coupler, and a nut. The body includes a receiver. The body is configured to be received within the plate opening. The sleeve is received within the body. The coupler includes a slot that receives the receiver such that the coupler is coupled to the body. The nut is coupled to the body such that the sleeve is repositionable within the body when the nut is coupled to the body.

11 Claims, 26 Drawing Sheets

(58) Field of Classification Search
CPC .... F16B 5/0628; F16M 13/02; F16M 5/0657; F16M 11/04
See application file for complete search history.

(56) References Cited

U.S. PATENT DOCUMENTS

| | | | |
|---|---|---|---|
| 2010/0278612 A1* | 11/2010 | Steffenfauseweh | B60Q 1/045 411/395 |
| 2010/0303582 A1* | 12/2010 | Choi | B62D 27/065 411/372.6 |
| 2011/0121153 A1 | 5/2011 | Magno et al. | |
| 2014/0252189 A1 | 9/2014 | Kifer et al. | |
| 2016/0245318 A1* | 8/2016 | Rajeev | F16B 5/01 |
| 2017/0314592 A1 | 11/2017 | Jodeleit et al. | |
| 2019/0008056 A1* | 1/2019 | Kreil | B60R 11/0235 |
| 2019/0289727 A1* | 9/2019 | Liu | F16B 5/0233 |
| 2020/0191183 A1* | 6/2020 | Hida | F16B 5/0216 |
| 2021/0372445 A1* | 12/2021 | Hida | F16B 5/0233 |

FOREIGN PATENT DOCUMENTS

| | | |
|---|---|---|
| CN | 103185193 A | 7/2013 |
| CN | 204178650 U | 2/2015 |
| CN | 206111757 U | 4/2017 |
| CN | 109920340 A | 6/2019 |
| JP | 2007-107572 A | 4/2007 |

OTHER PUBLICATIONS

First Office Action issued for Chinese Patent Application No. 202180012384.7 dated Dec. 27, 2022, 5 pages.

\* cited by examiner

DISPLAY PANEL MOUNTING SYSTEMS

CROSS-REFERENCE TO RELATED PATENT APPLICATION

The present application is a National Phase Application based on PCT/US2021/016534, filed Feb. 4, 2021, which claims priority to U.S. Provisional Patent Application No. 62/971,547, entitled "Display Panel Mounting Systems" and filed Feb. 7, 2020. The contents of these applications are incorporated by reference in their entireties.

TECHNICAL FIELD

The present application relates generally to display panel mounting systems.

BACKGROUND

Displays are often mounted on surfaces. These surfaces are typically not perfectly planar. In contrast, displays are typically planar along a rear surface (e.g., a surface of the display that is in confronting relation with the surface to which the display is mounted). As a result, a distance between the display and the surface may vary along the display. This variance may make mounting of the display on the surface difficult and can, for example, cause warping or damage to the surface and/or the display.

SUMMARY

In one embodiment, a display panel mounting system includes a plate and an adjustment device. The plate includes a plate opening. The adjustment device includes a body, a sleeve, a coupler, and a nut. The body includes a receiver. The body is configured to be received within the plate opening. The sleeve is received within the body. The coupler includes a slot that receives the receiver such that the coupler is coupled to the body. The nut is coupled to the body such that the sleeve is repositionable within the body when the nut is coupled to the body.

In another embodiment, a display panel mounting system includes a plate, a first adjustment device, and a second adjustment device. The plate includes a first plate opening and a second plate opening. The first adjustment device includes a first coupler, a first body, and a first sleeve. The first coupler includes a first slot. The first body includes a first receiver that is configured to be received within the first slot. The first body is configured to be received within the first plate opening. The first sleeve is received within the first body and threadably coupled to the first body. The second adjustment device includes a second coupler, a second body, and a second sleeve. The second coupler includes a second slot. The second body includes a second receiver that is configured to be received within the second slot. The second body is configured to be received within the second plate opening. The second sleeve is received within the second body and threadably coupled to the second body.

In yet another embodiment, an adjustment device for a display panel mounting system includes a body, a sleeve, and a coupler. The body includes a receiver. The receiver has an opening. The sleeve is received within the body and threadably coupled to the body. The coupler includes a slot. The slot is configured to be positioned in the opening such that the receiver is received within the slot and removed from the opening such that the receiver is removed from the slot.

In yet another embodiment, a method for mounting a display panel to a surface using a plate and an adjustment device including a coupler that is configured to be coupled to the display panel, a sleeve, and a body that is configured to be coupled to the surface and the plate includes determining a characteristic of the surface. The method also includes determining whether the adjustment device is compatible with the characteristic. The method also includes coupling the coupler to the display panel after determining that the adjustment device is compatible with the characteristic. The method also includes coupling the body to the plate after determining that the adjustment device is compatible with the characteristic. The method also includes coupling the body to the surface after coupling the body to the plate. The method also includes coupling the coupler to the body after coupling the body to the surface and coupling the coupler to the display panel.

BRIEF DESCRIPTION OF THE DRAWINGS

The details of one or more implementations are set forth in the accompanying drawing and the description below. Other features, aspects, and advantages of the disclosure will become apparent from the description, the drawing, and the claims, in which:

Figure 1:
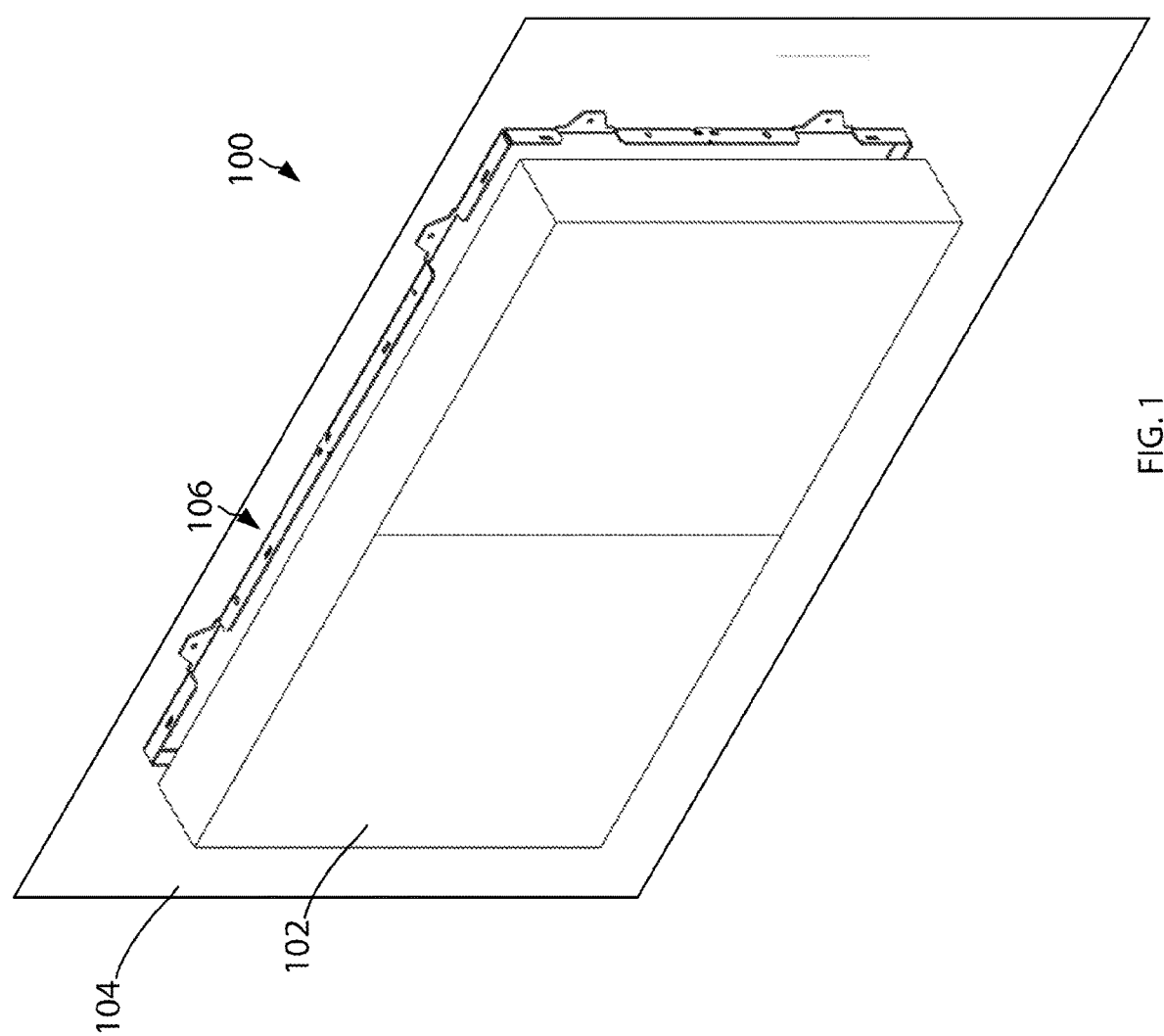
FIG. 1 is a perspective view of a display panel mounted to a display panel mounting system that is mounted to a surface.

It will be recognized that the Figures are schematic representations for purposes of illustration. The Figures are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, methods, apparatuses, and for mounting a display panel to a surface. The various concepts introduced above and discussed in greater detail below may be implemented in any of a number of ways, as the described concepts are not limited to any particular manner of implementation. Examples of specific implementations and applications are provided primarily for illustrative purposes.

I. Overview

In some applications, such as Direct View LED technology applications and other video wall applications, it is desirable to create a large display using a plurality of individual display panels that are located in close proximity to one another so as to form the display when viewed collectively. To provide the display on a wall, each of the display panels must be mounted on the wall. In order to minimize perceptible gaps between the panels, the panels may be attached to one another. However, this attachment typically creates rigidity that cannot easily account for mounting to imperfectly planar surfaces. For example, when the surface to which the panels are mounted contains dips, mounting of some of the panels within the dips may cause stresses on other panels that are not mounted within the dips. These stresses can cause the panels to become undesirable over time. While custom mounting brackets can be made to facilitate uniform mounting of a plurality of panels simultaneously, such custom mounting brackets are relatively expensive and time consuming to produce.

Implementations described herein are related to a display panel mounting system that includes a plate and an adjustment device. The adjustment device facilitates coupling of the plate to a surface and also facilitates adjustment of a distance between the plate and the surface. This adjustment can be made before the plate is coupled to the surface and after the plate is coupled to the surface. Once the plate has been coupled to the surface, a display panel is coupled to the plate via a coupler that is attached to the display panel and configured to be received within and coupled to the adjustment device.

Implementations herein are capable of being a modular one to one solution for use with display panels of various models and/or made by various manufacturers. The display panel mounting system described herein can be used to install one display panel at a time, or multiple display panel mounting systems can be installed simultaneously. For example, multiple plates of multiple display panel mounting systems can be attached to one another via tabs, projections, and/or flanges.

II. Example Display Panel Mounting System

FIG. 1 depicts a display panel mounting system 100 for mounting a display panel 102 (e.g., electronic display, light emitting diode (LED) display, liquid crystal display (LCD), video display, etc.) on a surface 104 (e.g., wall, panel, etc.). The display panel 102 may be a portion of a multi-display array that is mounted across the surface 104.

The display panel mounting system 100 includes a plate 106 (e.g., mounting plate, adapter plate, etc.) and one or more adjustment devices 108 (e.g., adjustors, couplers, etc.). In some embodiments, the plate 106 is manufactured specifically for the display panel 102 (e.g., the plate 106 has a dimension and/or shape corresponding to a target display panel 102, etc.). As is explained in more detail herein, the adjustment devices 108 are coupled to the plate 106 which interfaces with the display panel 102 and the adjustment devices 108 are coupled to the display panel 102 and the surface 104. The adjustment devices 108 are individually adjustable such that a distance between the plate 106 and the surface 104, and therefore a distance between the display panel 102 and the surface 104, can be rapidly adjusted and a target distance between the plate 106 and the surface 104 achieved. By facilitating individual adjustment across multiple mounting points to the surface 104, the display panel mounting system 100 can desirably mount the display panel 102 when the surface 104 is not perfectly planar (e.g., when the surface 104 is slightly warped, etc.).

Figure 2:
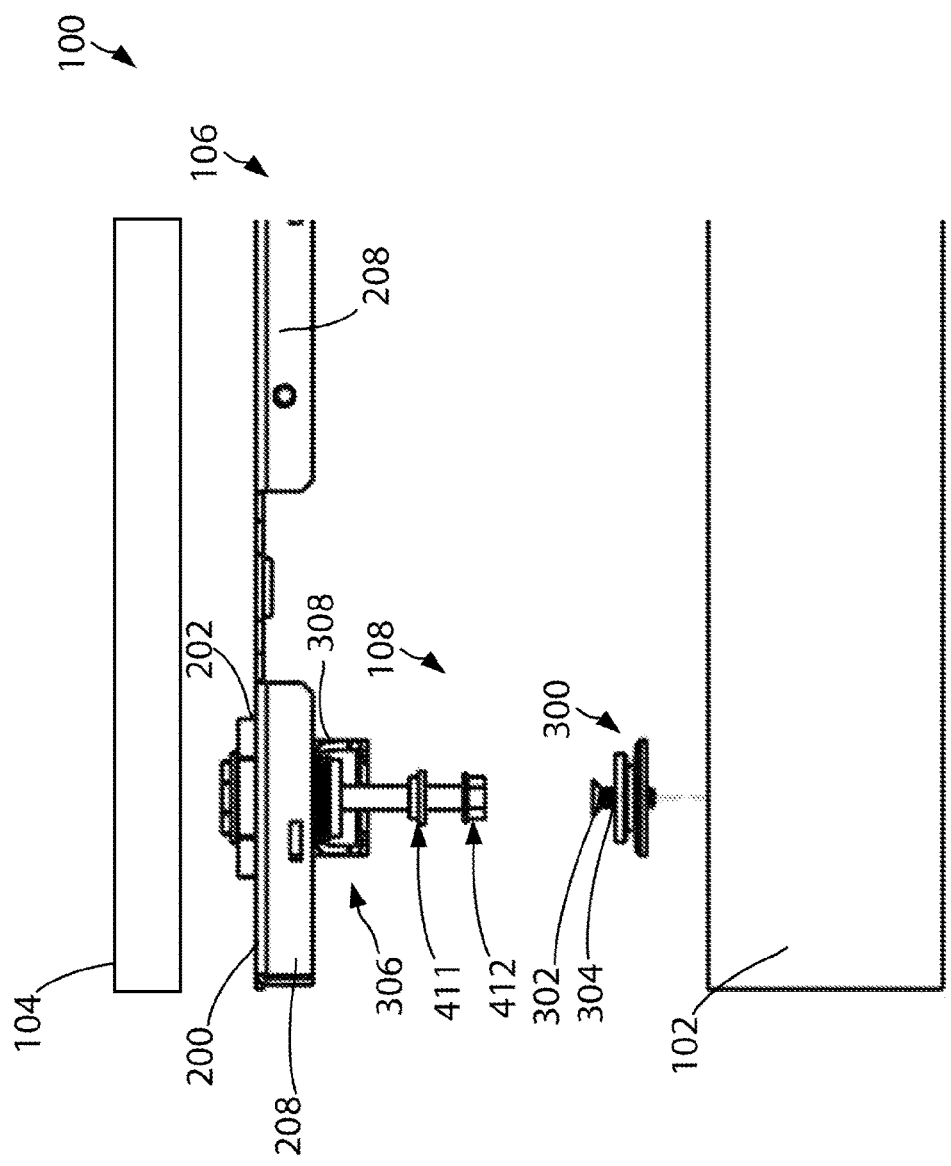
FIG. 2 is top exploded view of the display panel and the display panel mounting system shown in FIG. 1.
Figure 5:
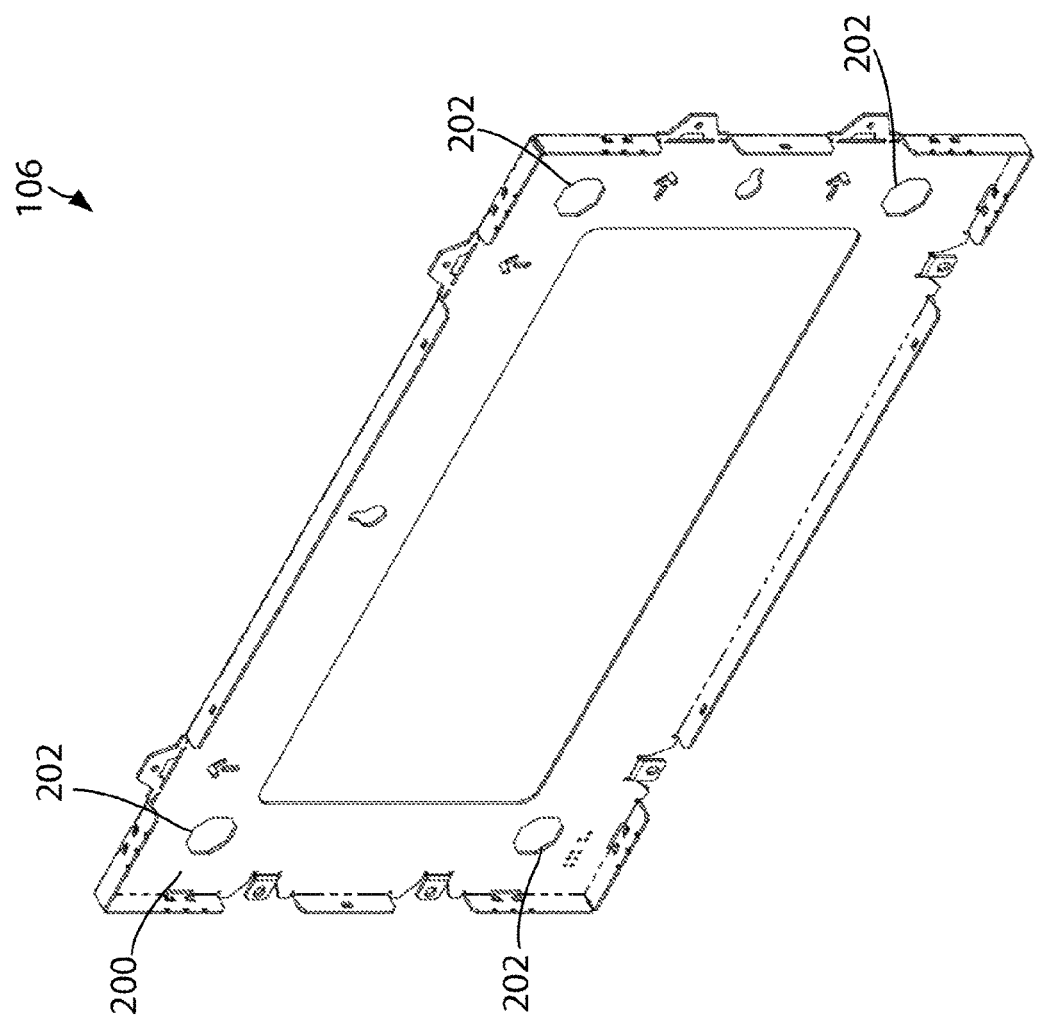
FIG. 5 is perspective view of the plate of the display panel mounting system shown in FIG. 1.
Figure 6:
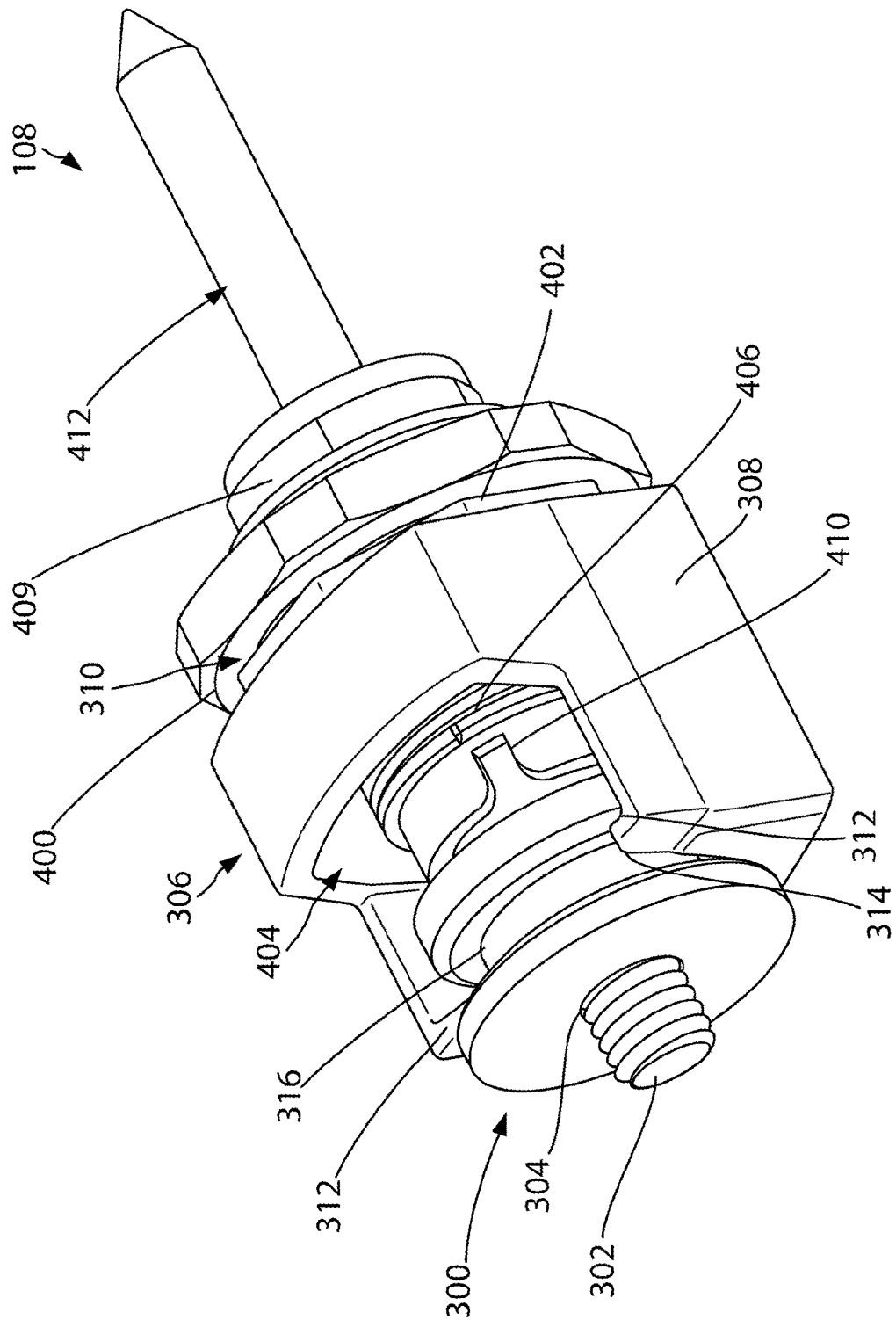
FIG. 6 is perspective view of one of the adjustment devices of the display panel mounting system shown in FIG. 1, according to some embodiments.
Figure 7:
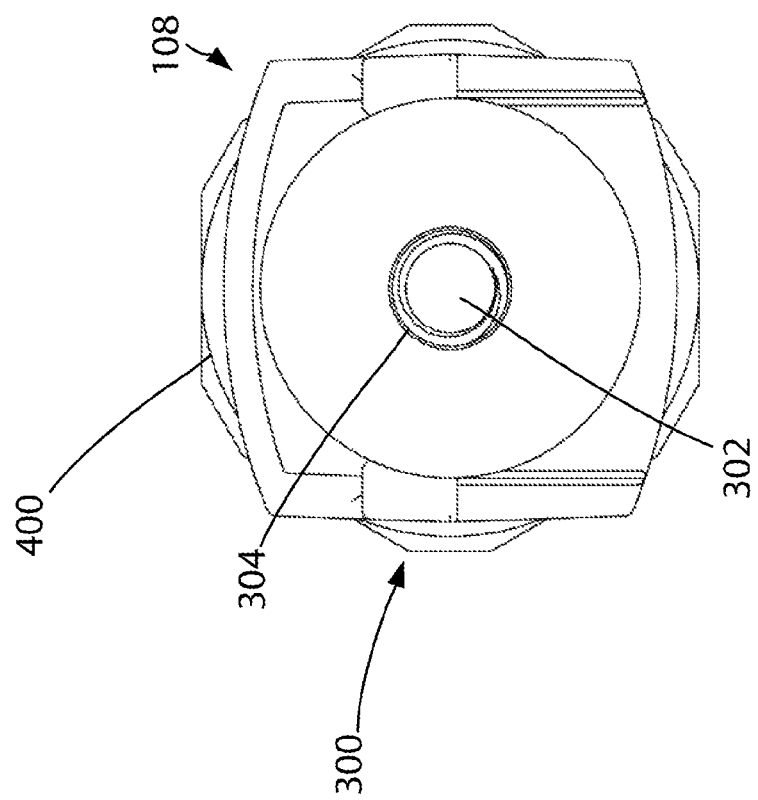
FIG. 7 is a front view of the adjustment device shown in FIG. 6.
Figure 8:
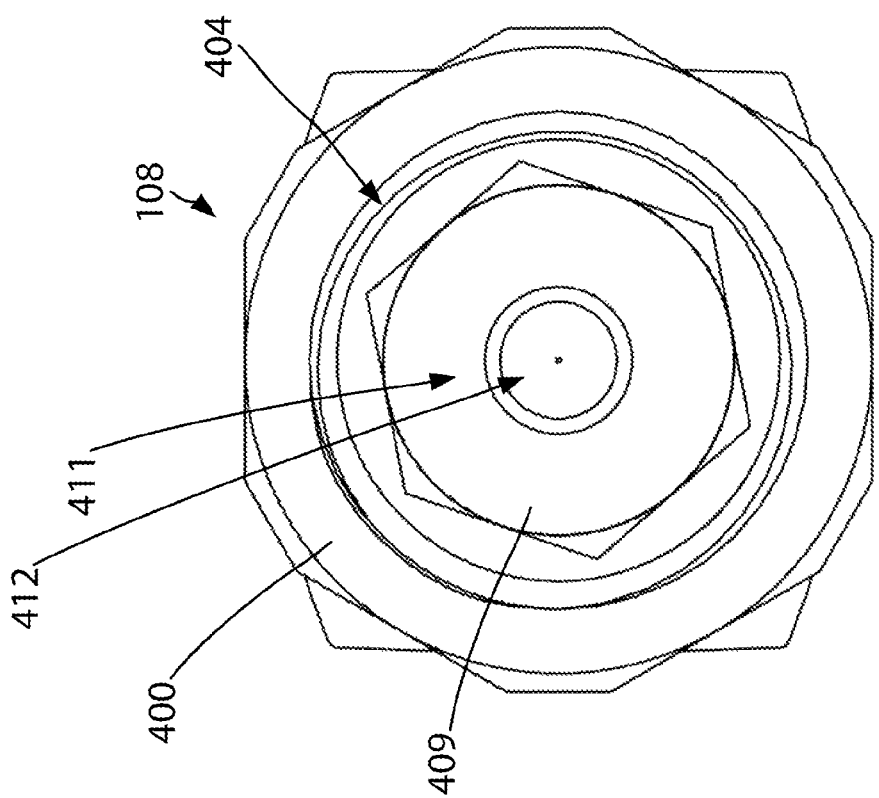
FIG. 8 is a rear view of the adjustment device shown in FIG. 6.
Figure 9:
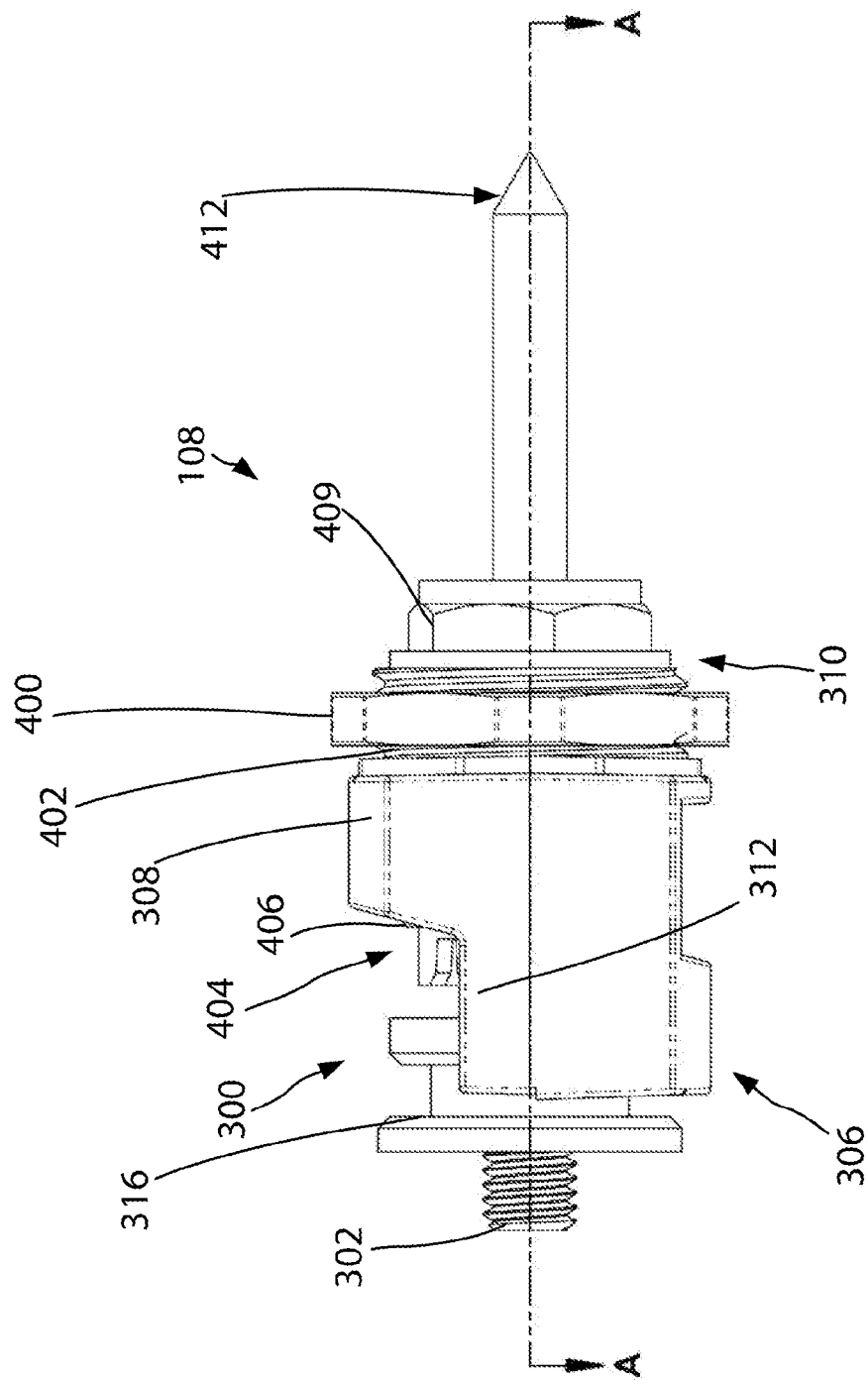
FIG. 9 is a side view of the adjustment device shown in FIG. 6.
Figure 10:
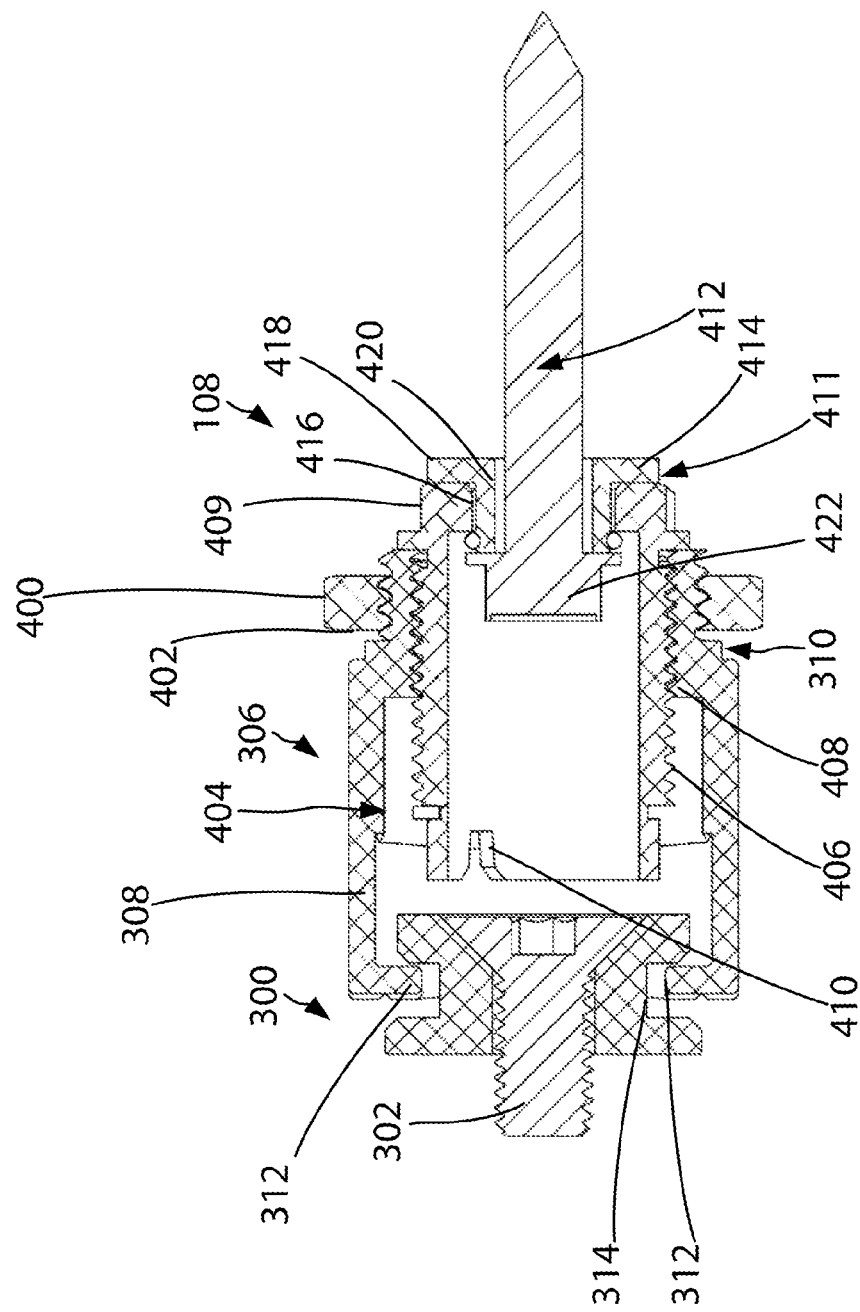
FIG. 10 is a cross-sectional view of the adjustment device shown in FIG. 9 taken along plane A-A.
Figure 11:
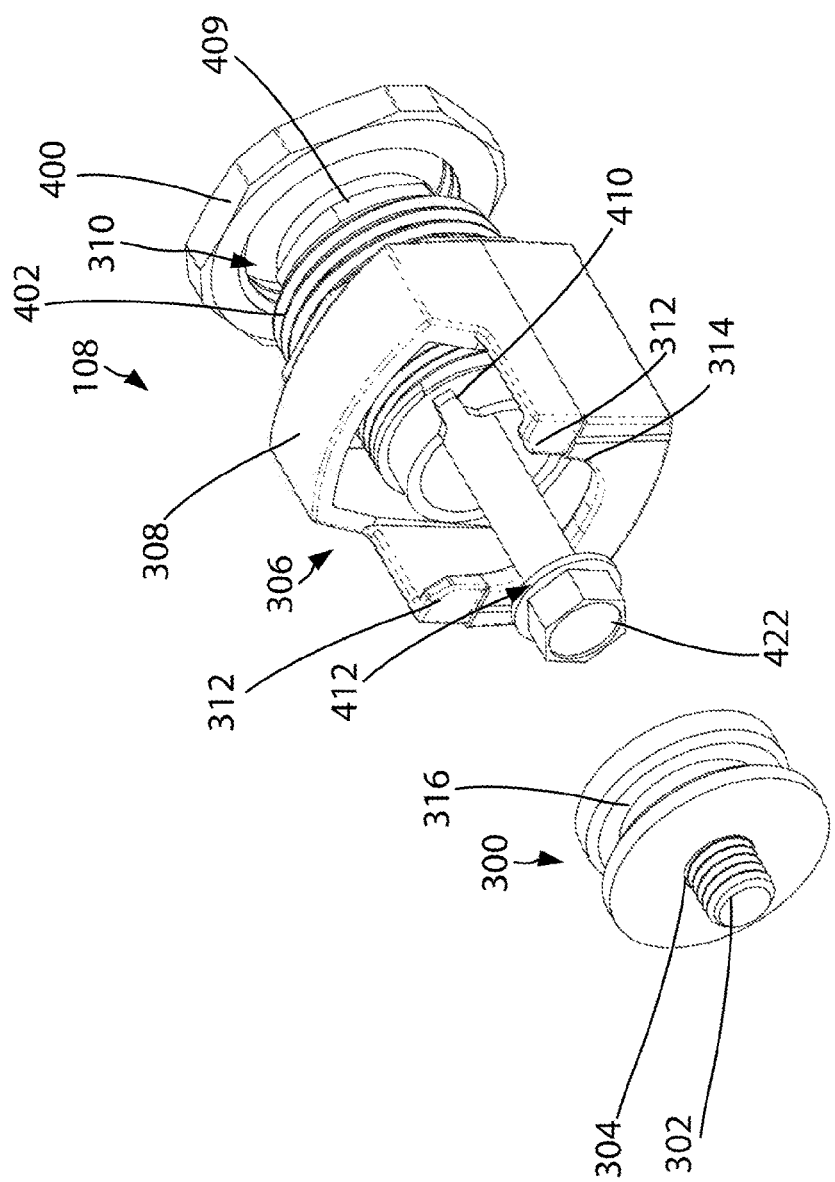
FIG. 11 is a perspective partially exploded view of the adjustment device shown in FIG. 6.
Figure 12:
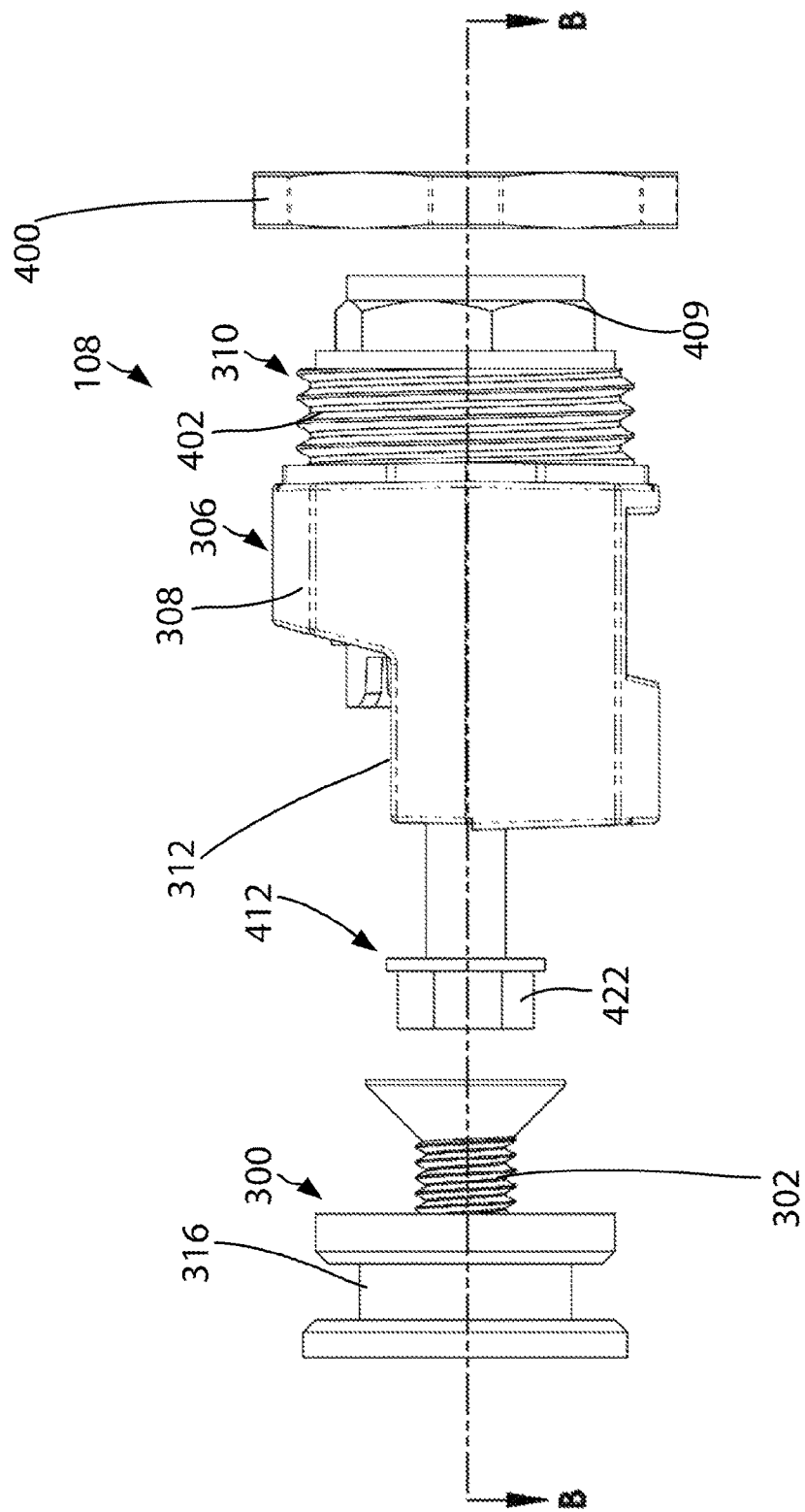
FIG. 12 is a side partially exploded view of the adjustment device shown in FIG. 6.
Figure 13:
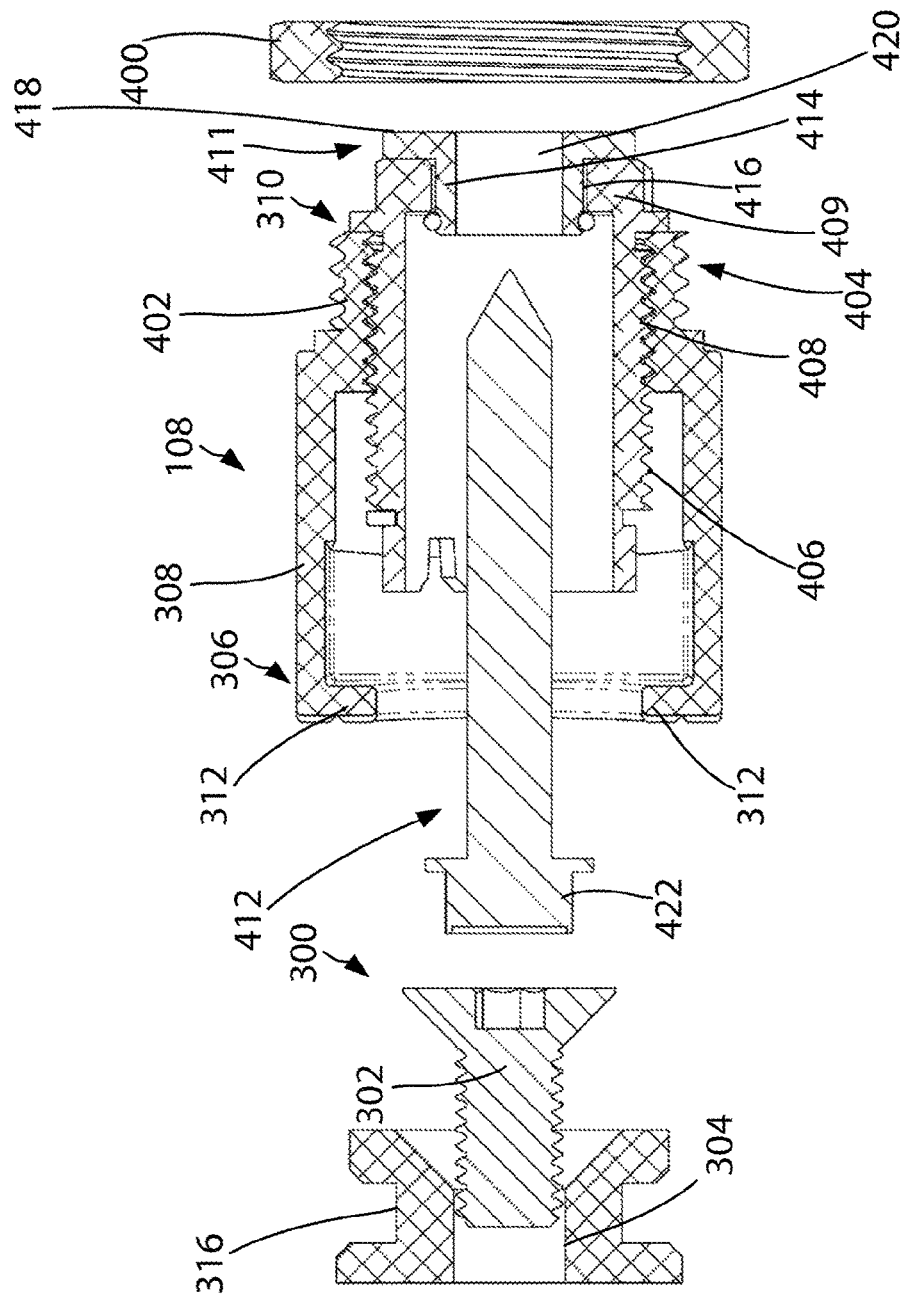
FIG. 13 is a cross-sectional view of the adjustment device shown in FIG. 12 taken along plane B-B.

As shown in FIG. 2, the plate 106 includes a main panel 200. The main panel 200 is configured to interface with a portion (e.g., rear surface, etc.) of the display panel 102. The plate 106 also includes one or more plate openings 202 (e.g., openings, bobbins, etc.). As is explained in more detail herein, each of the adjustment devices 108 is coupled to the plate 106 at one of the plate openings 202. In some embodiments, the number of plate openings 202 is equal to the number of adjustment devices 108. In various embodiments, such as is shown in FIG. 5, the plate 106 is rectangular or square and the plate 106 includes one plate opening 202 at each corner of the plate 106.

In various embodiments, the plate 106 also includes at least one tab 204, at least one slot 205, and at least one projection 206. Each tab 204 extends over (e.g., protrudes away from the surface 104 when the display panel mounting system 100 is mounted to the surface 104, etc.) and across one of the slots 205. A shape of the slot 205 is complementary to a shape of the projection 206. Each tab 204 is configured to be coupled to a projection 206 of another display panel mounting system 100 when the projection 206 is received within the slot 205 associated with the tab 204. Similarly, each projection 206 is configured to be inserted into a slot 205 of another display panel mounting system 100 and to be coupled to a tab 204 associated with the slot 205. In this way, the tabs 204 and the projections 206 facilitate installation of the display panel mounting system 100 in conjunction with other display panel mounting systems 100. In some embodiments, the tabs 204 and/or the projections 206 are separate components which are attached (e.g., via fasteners, etc.) to the plate 106.

Figure 3:
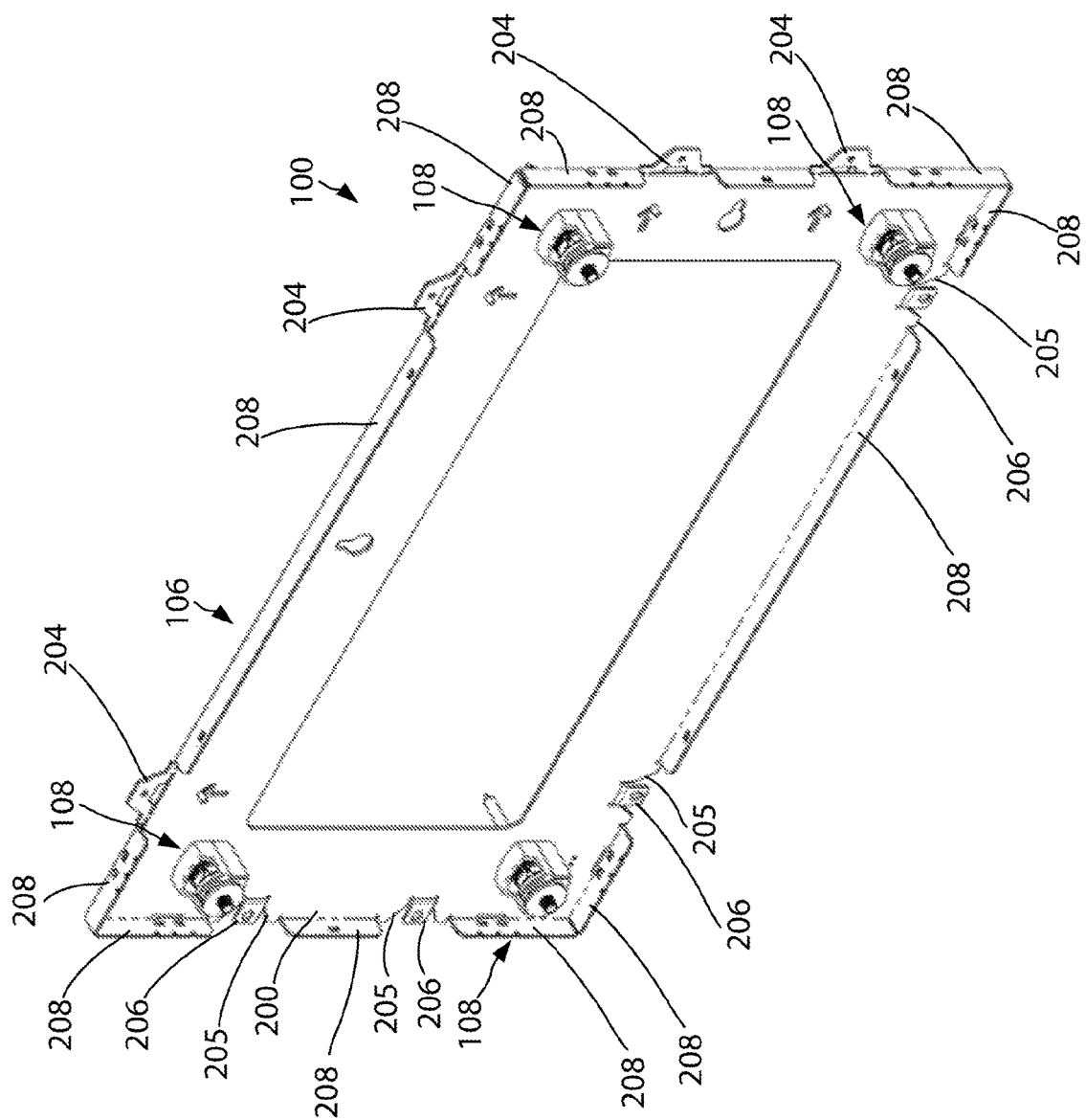
FIG. 3 is perspective view of the display panel mounting system shown in FIG. 1.
Figure 4:
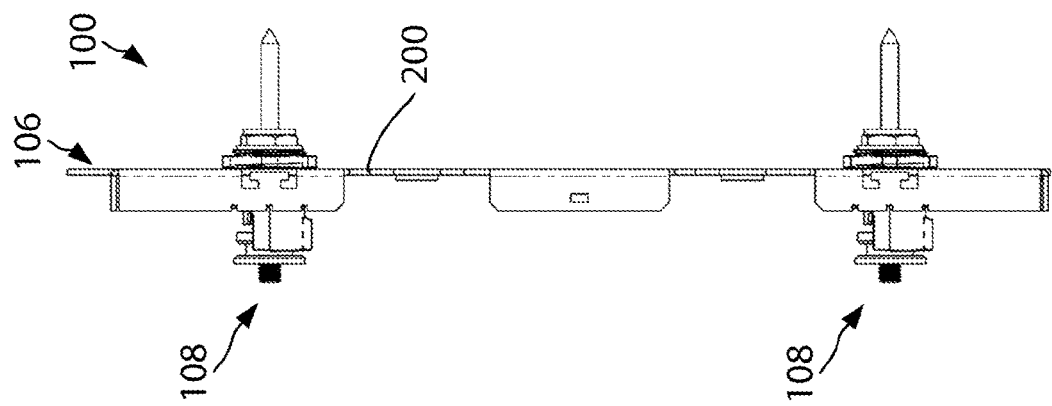
FIG. 4 is side view of the display panel mounting system shown in FIG. 3.

Each tab 204 is disposed along an edge of the plate 106 and each projection 206 is disposed along another edge of the plate 106. In various embodiments, such as is shown in FIG. 3, the plate 106 includes tabs 204 disposed along a first edge, tabs 204 disposed along a second edge contiguous with the first edge, projections 206 disposed along a third edge contiguous with the second edge, and projections 206 disposed along a fourth edge contiguous with the third edge and the first edge. Such an arrangement of the tabs 204 and projections 206 may be beneficial when installing the display panel mounting system 100 in conjunction with other display panel mounting systems 100.

In some embodiments, the tabs 204 and/or the projections 206 are separable from the plate 106. For example, the tabs 204 and/or the projections 206 may be bent and snapped off of the plate 106.

The plate 106 also includes one or more flanges 208. The flanges 208 are each contiguous with, or disposed proximate to, one of the edges of the plate 106. The flanges 208 protrude from the plate 106 so as to extend away from the surface 104 when the display panel mounting system 100 is mounted to the surface 104. The flanges 208 facilitate coupling of one display panel mounting system 100 to another display panel mounting system 100. For example, a fastener may be inserted through a flange 208 on one display panel mounting system 100 and through another flange 208 on an adjacent display panel mounting system 100. Additionally, the flange 208 may receive a flexible plumb line to facilitate alignment of the display panel mounting system 100 on the surface 104.

Each adjustment device 108 includes a coupler 300. The coupler 300 is configured to be coupled to the display panel 102 via a display panel fastener 302 that extends through a coupler opening 304 in the coupler 300. To couple the coupler 300 to the display panel 102, the display panel fastener 302 is inserted through the coupler opening 304 and the display panel fastener 302 is threaded into the display panel 102. As the display panel fastener 302 is threaded into the display panel 102, the coupler 300 is drawn closer to, and eventually tightened against, the display panel 102.

Each adjustment device 108 also includes a body 306. The body 306 is configured to be partially inserted into one of the plate openings 202. The body 306 includes a body shell 308 and a body insert 310. The body insert 310 is contiguous with the body shell 308 and is separated from the display panel 102 by the body shell 308 when the adjustment device 108 is coupled to the display panel 102.

The body shell 308 includes a receiver 312 (e.g., tang, clip, projection, rib, etc.). In various embodiments, the receiver 312 is disposed along a circular arc. The receiver 312 includes an opening 314. The receiver 312 is configured to be received within a slot 316 in the coupler 300. In various embodiments, the slot 316 is an annular slot such that the receiver 312 can be received within the slot 316 regardless of the orientation of the coupler 300 relative to the body shell 308. When the receiver 312 is received within the slot 316, the body shell 308 is coupled to the coupler 300. In this way, the body 306 may be coupled to the display panel 102 through the coupler 300.

The body shell 308 is defined by a first dimension (e.g., diameter, width, etc.) and the body insert 310 is defined by a second dimension (e.g., diameter, width, etc.) less than the first dimension. As is explained in more detail herein, the adjustment device 108 is configured to be coupled to the plate 106 by the body insert 310 being inserted into the plate opening 202 and the plate 106 interfacing with the body shell 308 (e.g., along a face of the body 306 between the body shell 308 and the body insert 310).

In various embodiments, each adjustment device 108 also includes a nut 400. The body insert 310 includes a body insert external surface 402 that is threaded. The nut 400 is configured to be threaded onto the body insert external surface 402. To couple the adjustment device 108 to the plate 106, the body insert 310 is inserted into the plate opening 202 and the nut 400 is threaded onto the body insert external surface 402 and tightened such that the plate 106 is captured between the body shell 308 and the nut 400.

In some embodiments, the main panel 200 includes threaded receivers disposed around each of the plate openings 202. These threaded receivers function as the nut 400 and couple the adjustment device 108 to the plate 106. In these embodiments, the nut 400 either may be omitted or may be included and utilized in conjunction with the threaded receivers.

Each adjustment device 108 also includes a sleeve 404. The sleeve 404 is configured to be received within the body 306. The sleeve 404 includes a sleeve external surface 406 that is threaded. The sleeve external surface 406 is configured to be threaded into a body insert internal surface 408 of the body insert 310 that is threaded. When the sleeve 404 is received within the body 306, the sleeve 404 is separated from the nut 400 by the body insert 310. The sleeve 404 is configured such that the sleeve 404 is separated from the coupler 300 when the coupler 300 is coupled to the body shell 308 and the sleeve 404 is received within the body 306. For example, a length of the body 306 may be greater than a sum of a length of the sleeve 404 and a length of a portion of the coupler 300 (e.g., the portion of the coupler 300 that is positioned within the body 306 when the coupler 300 is coupled to the body 306).

The sleeve 404 includes a sleeve end 409. The sleeve end 409 protrudes from the body 306 when the sleeve 404 is received within the body 306. The sleeve end 409 is shaped to be manipulated by a tool (e.g., wrench, pliers, screwdriver, etc.) to facilitate threading of the sleeve 404 into and out of the body 306. In various embodiments, the sleeve end 409 is shaped like a nut so as to be manipulated by a wrench (e.g., adjustable wrench, etc.) to facilitate threading of the sleeve 404 into and out of the body 306.

In various embodiments, the sleeve 404 also includes sleeve slots 410. The sleeve slots 410 are located opposite the sleeve end 409 and are configured to be exposed within the body shell 308 so that a tool (e.g., screwdriver, ring pliers, etc.) can be inserted into the sleeve slots 410 while the sleeve 404 is received within the body 306. Through the sleeve slots 410, a user can facilitate rotation of the sleeve 404 relative to the body 306, thereby enabling adjustment of the sleeve 404 relative to the body 306 after the body 306 has been coupled to the surface 104.

Each adjustment device 108 also includes a retainer 411 and a surface fastener 412. The retainer 411 includes a retainer insert 414 that is received within a sleeve opening 416 in the sleeve 404. A retainer flange 418 of the retainer 411 interfaces with the sleeve 404 around the sleeve opening 416 when the retainer insert 414 is received within the sleeve opening 416. The surface fastener 412 is received within a retainer opening 420 in the retainer 411. The surface fastener 412 includes a surface fastener head 422 that is configured to interface with the retainer 411 around the retainer opening 420 when the surface fastener 412 is received within the retainer opening 420. In various embodiments, the retainer opening 420 is facilitated to provide a relatively small clearance between the retainer 411 and the surface fastener 412, thereby facilitating a relatively small adjustment of the body 306 relative to the surface fastener 412 when the surface fastener 412 is coupled to the surface 104.

In various embodiments, the entire adjustment device 108 is located where mounting screws are located on the display panel 102. As a result, all adjustment and mount components may reside within the display panel mounting system 100 which is tied together within the plate 106. In some embodiments, the surface fastener 412 is received within extrusions in the surface 104.

In some embodiments, the display panel mounting system 100 includes one adjustment device 108 that does not include the surface fastener 412 and is not coupled to the surface 104. When the display panel 102 is coupled to the surface 104, this adjustment device 108 is coupled to the display panel 102 (e.g., via the coupler 300 and the body 306, etc.) and to the plate 106 (e.g., via the nut 400 and the body 306), but is not coupled to the surface 104. As a result of utilizing an adjustment device 108, adjustment of the display panel 102 relative to the surface 104 may be facilitated by interacting with less adjustment devices 108. For example, three or more adjustment devices 108 could be utilized which each do include the surface fastener 412 and which are each coupled to the surface 104, and one or more adjustment devices 108 could be utilized which each do not include the surface fastener 412 and which are each not coupled to the surface 104. In this example, the three or more adjustment devices 108 could define a plane and/or be located along corners of the plate 106. Also in this example, the one or more adjustment devices 108 could be located inwards relative to the three or more adjustment devices 108.

In some embodiments, one or more of the adjustment devices 108 do not couple to the plate 106 when the one or more adjustment devices 108 are coupled to the surface 104 and the display panel 102. For example, the display panel mounting system 100 may not include the plate 106 such that all of the adjustment devices do not couple to the plate 106 when the adjustment devices 108 are coupled to the surface 104 and the display panel 102.

Figure 14:
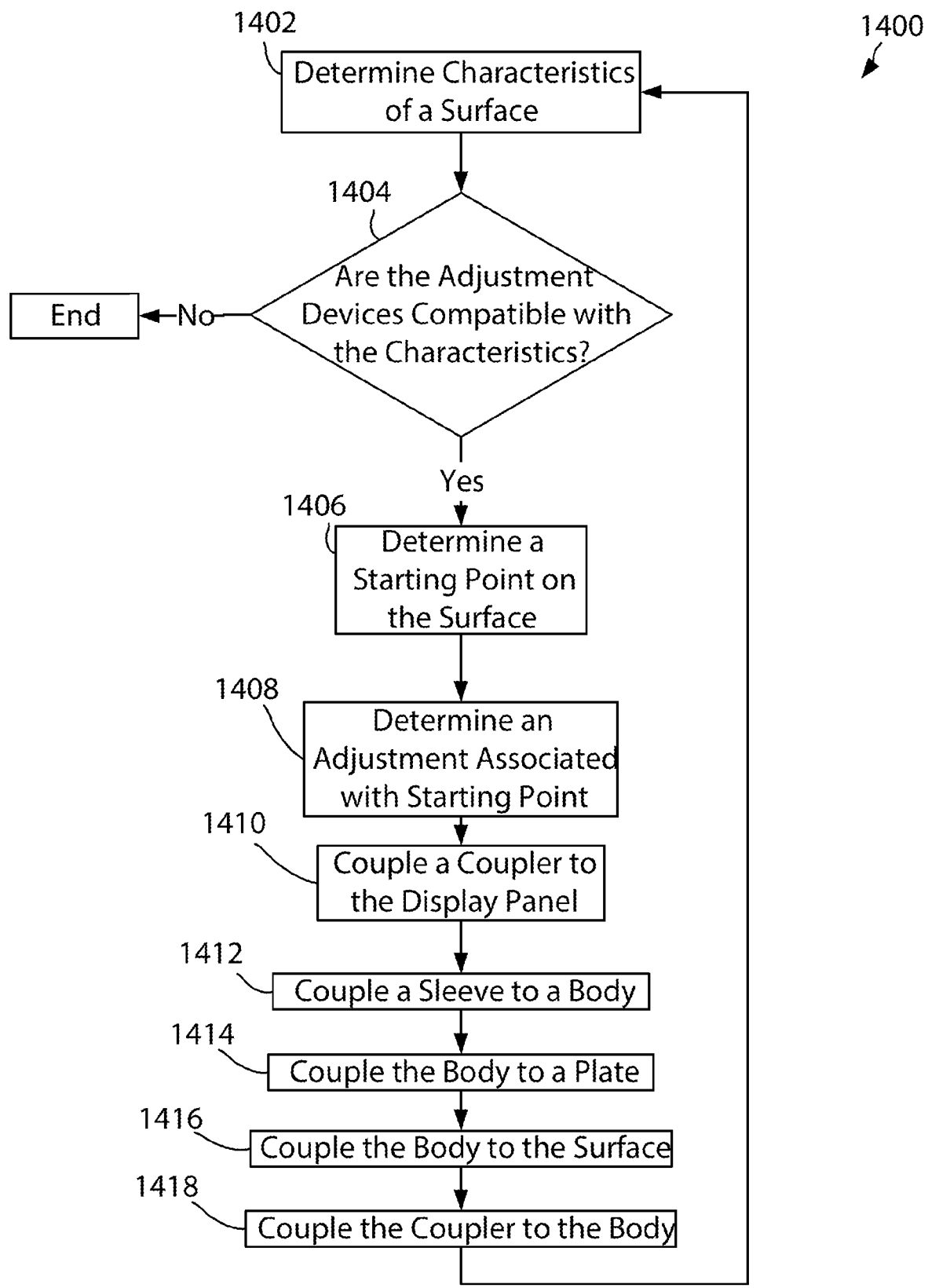
FIG. 14 is a block diagram of a method for mounting a display panel to a surface using the display panel mounting system shown in FIG. 1.

FIG. 14 illustrates an example method 1400 for mounting the display panel 102 to the surface 104 using the display panel mounting system 100. The method 1400 begins in block 1402 with determining characteristics (e.g., flatness, surface roughness, average peak height, average valley depth, etc.) of the surface 104. The method 1400 continues in block 1404 with determining if the adjustment devices 108 are compatible with the characteristics of the surface 104. For example, if the adjustment devices 108 may be compatible with surfaces having an average peak height of less than 2 inches and an average valley depth of less than 2 inches. Following this example, the adjustment devices 108 may be determined to be compatible if the average peak height of the surface 104 is less than or equal to 2 inches and the average valley depth of the surface 104 is less than or equal to 2 inches. If the adjustment devices 108 are not compatible with the characteristics of the surface 104, the method 1400 ends (e.g., the method 1400 may then be repeated with different adjustment devices 108 being compatible with different characteristics, the method 1400 may then be repeated with a surface having different characteristics, etc.).

If the adjustment devices 108 are compatible with the characteristics of the surface 104, the method 1400 continues in block 1406 with selecting a starting point on the surface 104. The starting point may be, for example, a highest point on the surface 104 which is desired to be covered with the display panel 102. The method 1400 then continues in block 1408 with determining an adjustment associated with the starting point. For example, if the starting point has a peak height of 0.5 inches, the adjustment may be −0.5 inches. Importantly, the adjustment using the adjustment device 108 is made prior to the display panel 102 being coupled to the surface 104. In contrast, other systems may facilitate adjustment after a panel is attached to a wall. Such systems may place torque and tension on the panel and/or wall. This torque and tension may cause damage to the panel and/or wall, which causes these other systems to be undesirable.

The method 1400 continues in block 1410 with coupling the coupler 300 to the display panel 102. The display panel fastener 302 is inserted through the coupler opening 304 and then threaded into the display panel 102. The method 1400 continues in block 1412 with coupling a sleeve 404 to a body 306. The sleeve external surface 406 is threaded into the body insert internal surface 408. The sleeve 404 is coupled to the body 306 based on the adjustment. For example, if the adjustment is −0.5 inches, the sleeve external surface 406 may be threaded further into the body insert internal surface 408 than if the adjustment was 0.5 inches.

The method 1400 continues in block 1414 with coupling the body 306 to a plate 106. The body insert 310 is inserted into the plate opening 202 and the nut 400 is threaded onto the body insert external surface 402 such that the plate 106 is captured between the nut 400 and the body shell 308.

The method 1400 continues in block 1416 with coupling the body 306 to the surface 104. The surface fastener 412 is inserted through the retainer opening 420 in the retainer 411. The retainer 411 and the surface fastener 412 are then inserted into the body 306 and the sleeve 404 and the surface fastener 412 and the retainer insert 414 are inserted through the sleeve opening 416. The surface fastener 412 is then inserted into the surface 104. For example, the surface fastener 412 may be threaded into the surface 104.

The method 1400 continues in block 1418 with coupling the coupler 300 to the body 306. The display panel 102 is positioned above the body 306 and lowered such that the receiver 312 is received within the slot 316 and the coupler 300 is supported by the body shell 308 on the surface 104. The method 1400 then continues to back to block 1402 and the method 1400 is continued with another adjustment device 108.

FIGS. 15-18 illustrate the display panel mounting system 100 having multiple plates 106 mounted to the surface 104. In such applications, the plates 106 can be vertically and horizontally aligned such that the adjustment devices 108 coupled to one of the plates 106 are aligned with the adjustment devices 108 coupled to another of the plates 106. Aligning the adjustment devices 108 in this way may, for example, facilitate mounting of a display panel (e.g., the display panel 102 shown in FIG. 1, etc.) using multiple plates 106. Mounting of the display panel using multiple plates 106 may distribute a loading from the display panel across plates 106, thereby distributing the loading across a larger area of the surface 104, which may decrease stress on the surface 104.

Figure 15:
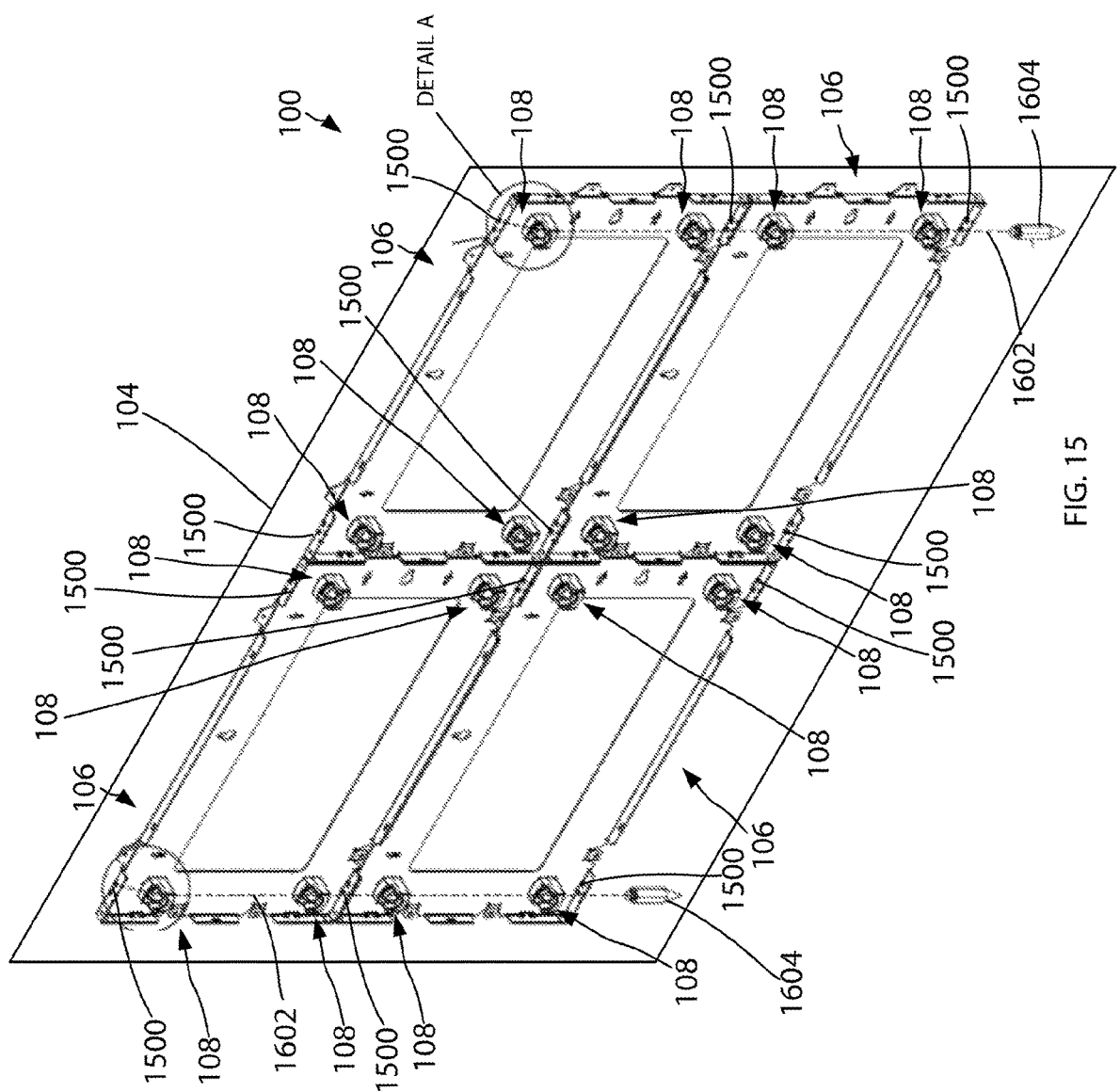
FIG. 15 is a perspective view of a display panel mounting system with multiple plates being vertically aligned.

As shown in FIG. 15, each of the plates 106 includes one or more vertical alignment holes 1500 (e.g., apertures, openings, windows, slots, etc.). At least one of the vertical alignment holes 1500 is aligned with two plate openings (e.g., the plate openings 202 shown in FIG. 5, etc.) when viewed along a plane that is orthogonal to a plane along which the surface 104 is disposed. As a result, at least one of the vertical alignment holes 1500 is aligned with two of the adjustment devices 108 when viewed along a plane that is orthogonal to a plane along which the surface 104 is disposed.

Figure 16:
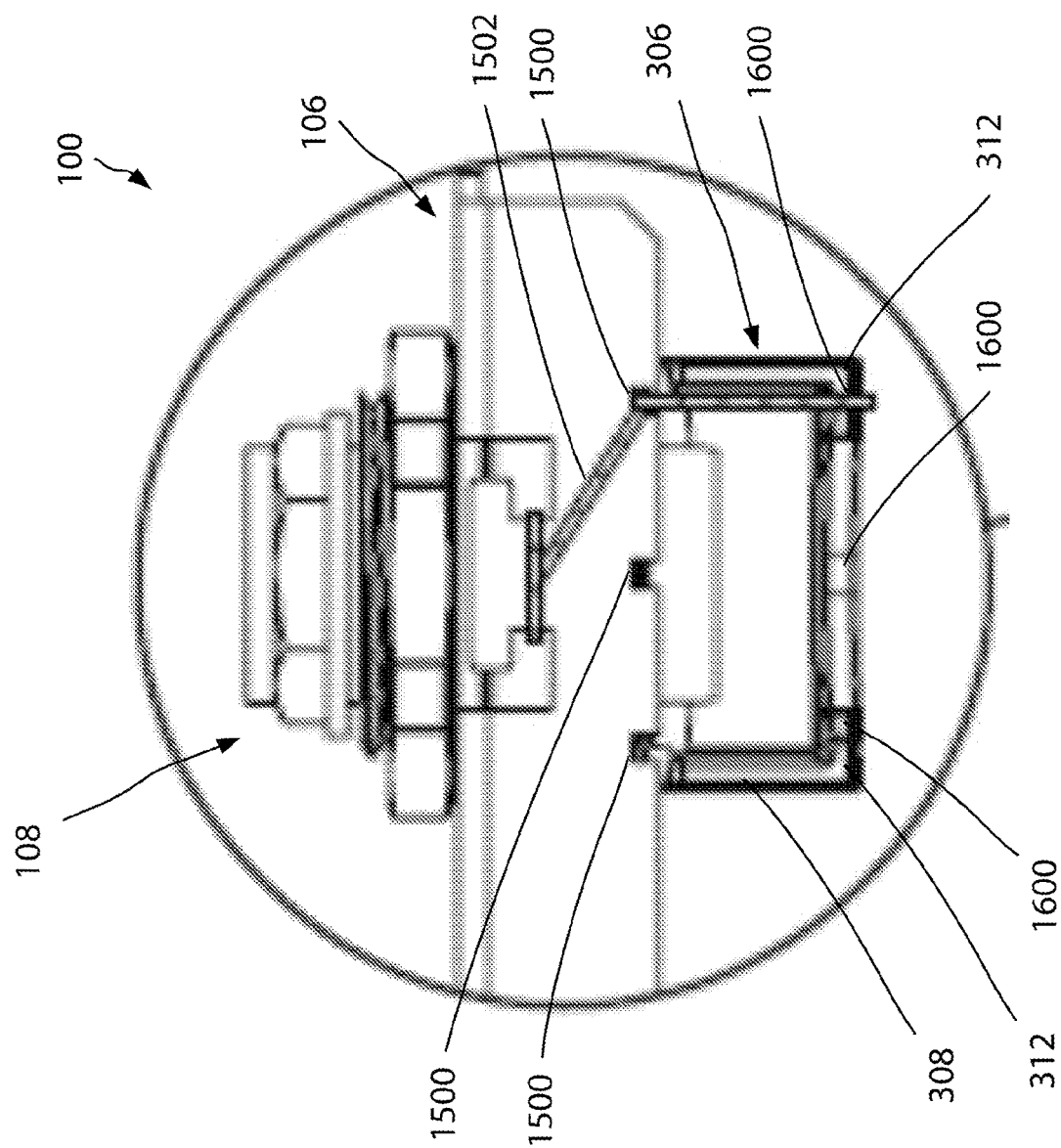
FIG. 16 is a detailed view of DETAIL A shown in FIG. 15.

Referring to FIG. 16, the adjustment devices 108 include one or more vertical alignment slots 1600 (e.g., apertures, openings, windows, etc.) formed in the body 306. The body 306 is configured such that each of the vertical alignment slots 1600 is aligned with one of the vertical alignment holes 1500 when the body 306 is coupled to the plate 106.

To vertically align the adjustment devices 108, a flexible line 1602 (e.g., string, cord, rope, etc.) is attached (e.g., tied, etc.) to one of the vertical alignment holes 1500 on an upper one of the plates 106. A weight 1604 (e.g., plumb, etc.) is attached to an end of the flexible line 1602 opposite the one of the vertical alignment holes 1500 to which the flexible line 1602 is attached. As a result of the weight 1604, the flexible line 1602 is oriented in the direction of gravity (e.g., vertically, etc.). The plates 106 are then repositioned relative to the surface 104 until the flexible line 1602 is received within one of the vertical alignment slot 1600 of a first adjustment device 108 that is coupled to a first of the plates 106 and the vertical alignment slot 1600 of a second adjustment device 108 that is coupled to a second of the plates 106. As a result, the first and second adjustment devices 108, and therefore the first and second plates 106, are vertically aligned. The plates 106 are then be secured to the surface 104 (e.g., if not horizontal alignment is needed, if horizontal alignment has been performed, etc.).

Figure 17:
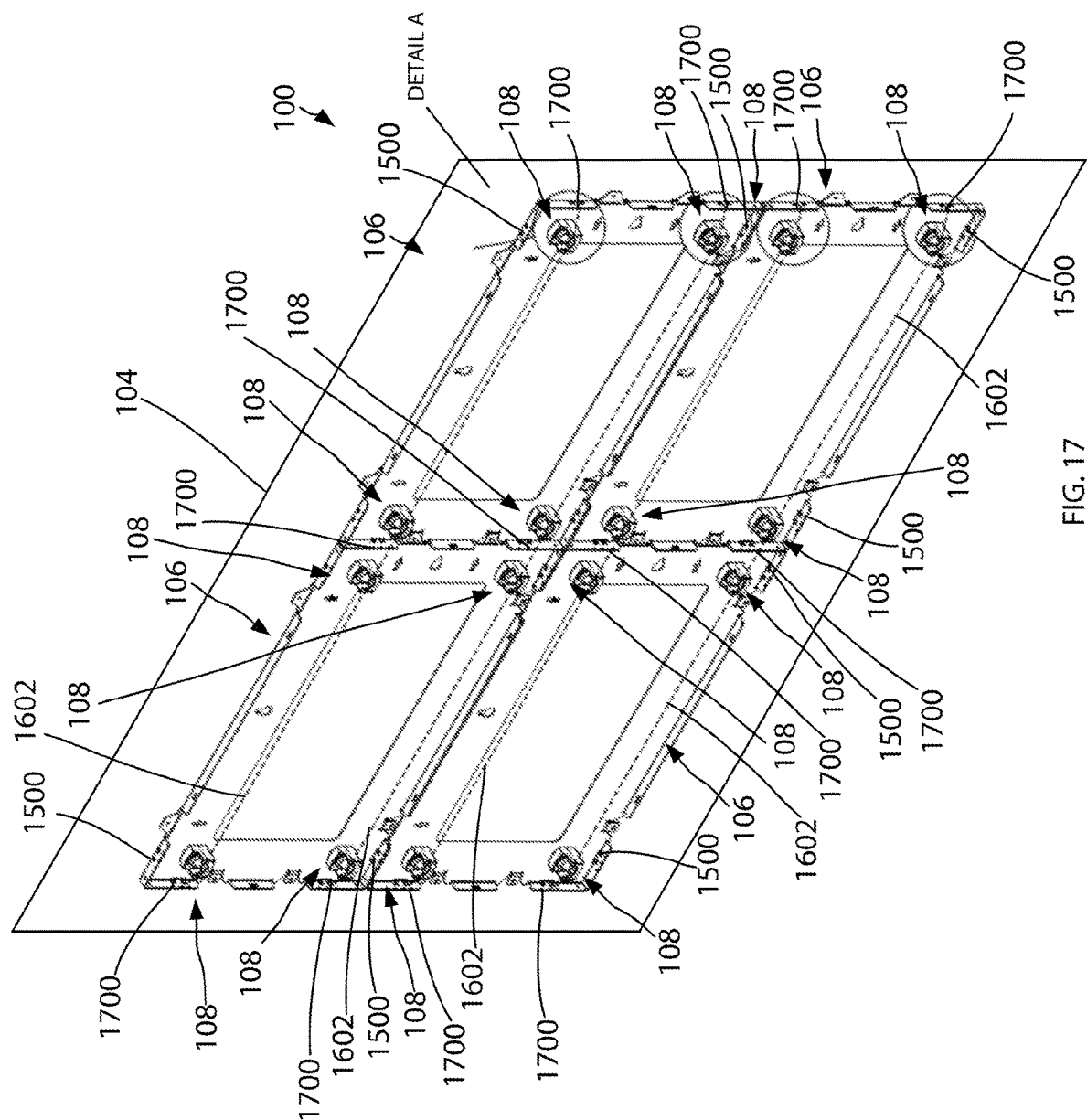
FIG. 17 is a perspective view of a display panel mounting system with multiple plates being horizontally aligned.

As shown in FIG. 17, each of the plates 106 includes one or more horizontal alignment holes 1700 (e.g., apertures, openings, windows, slots, etc.). At least one of the horizontal alignment holes 1700 is aligned with two of the plate openings (e.g., the plate openings 202 shown in FIG. 5, etc.) when viewed along a plane that is orthogonal to a plane along which the surface 104 is disposed. As a result, at least one of the horizontal alignment holes 1700 is aligned with two of the adjustment devices 108 when viewed along a plane that is orthogonal to a plane along which the surface 104 is disposed.

Figure 18:
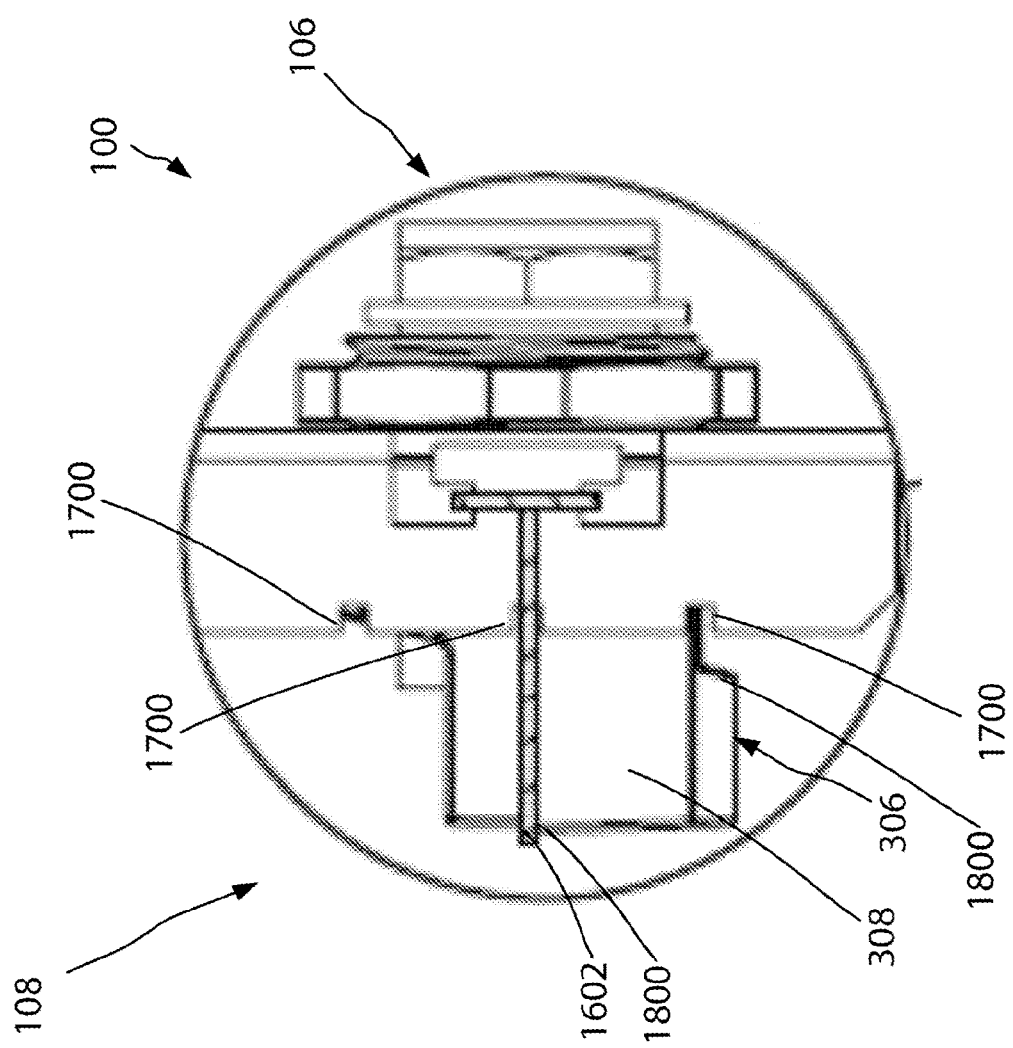
FIG. 18 is a detailed view of DETAIL A shown in FIG. 17.
Figure 19:
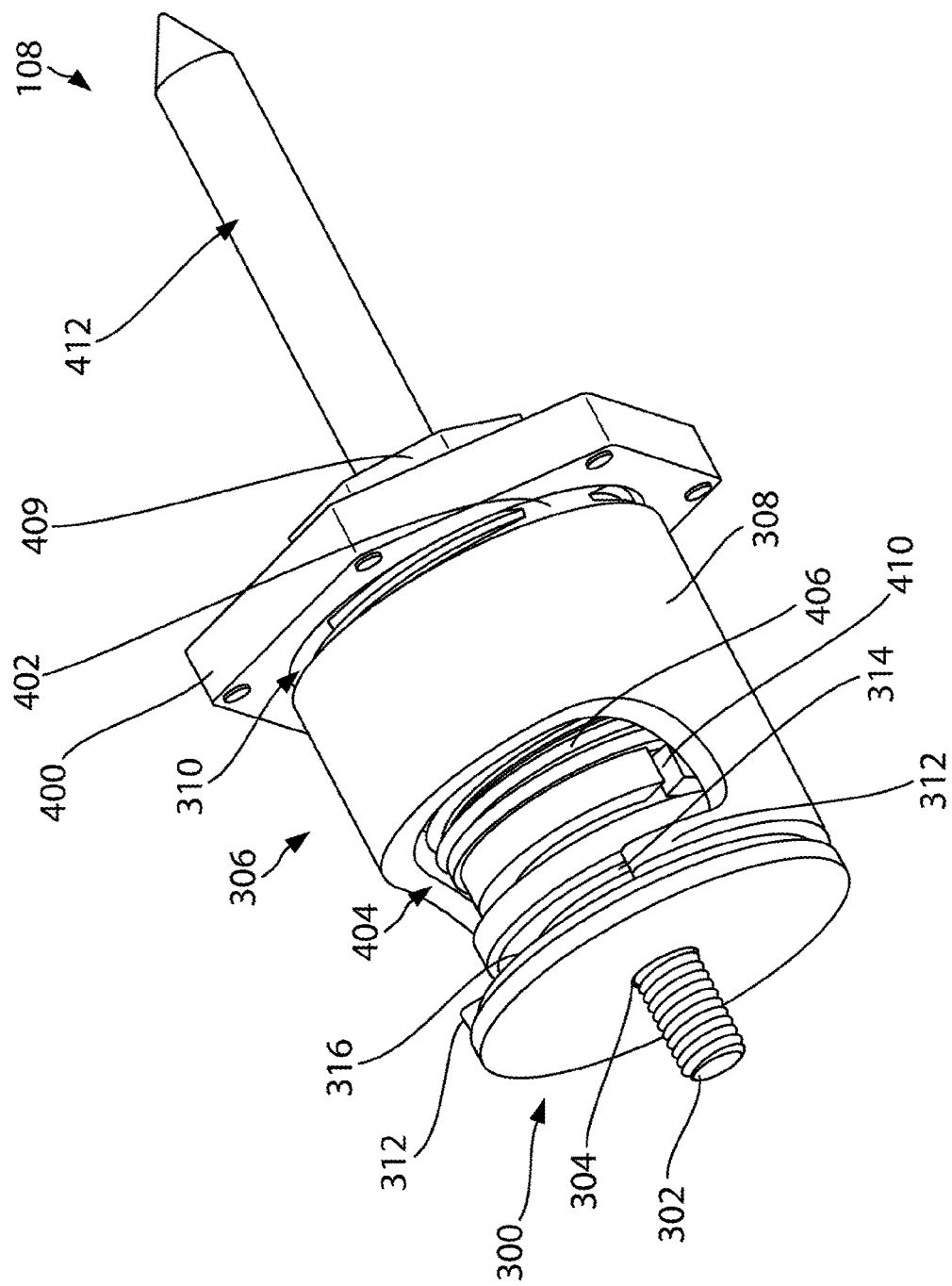
FIG. 19 is perspective view of an adjustment device for use in the display panel mounting system shown in FIG. 1, according to another set of embodiments.
Figure 20:
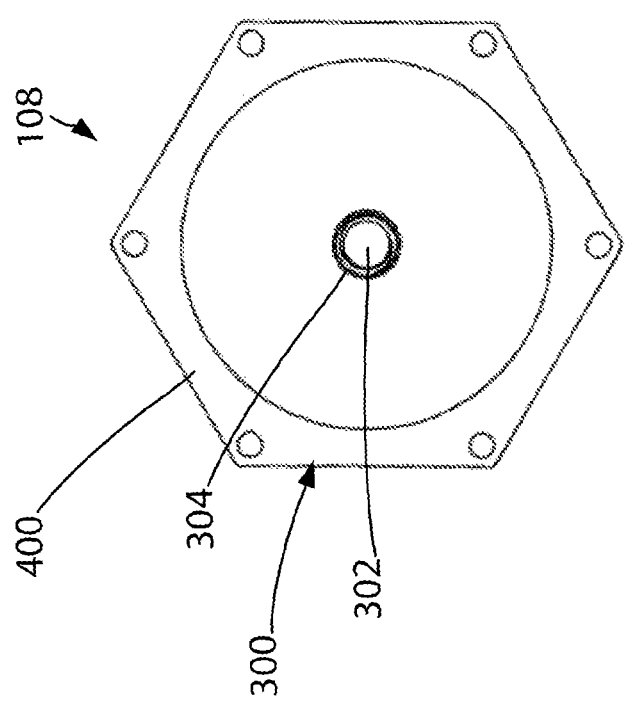
FIG. 20 is a front view of the adjustment device shown in FIG. 19.
Figure 21:
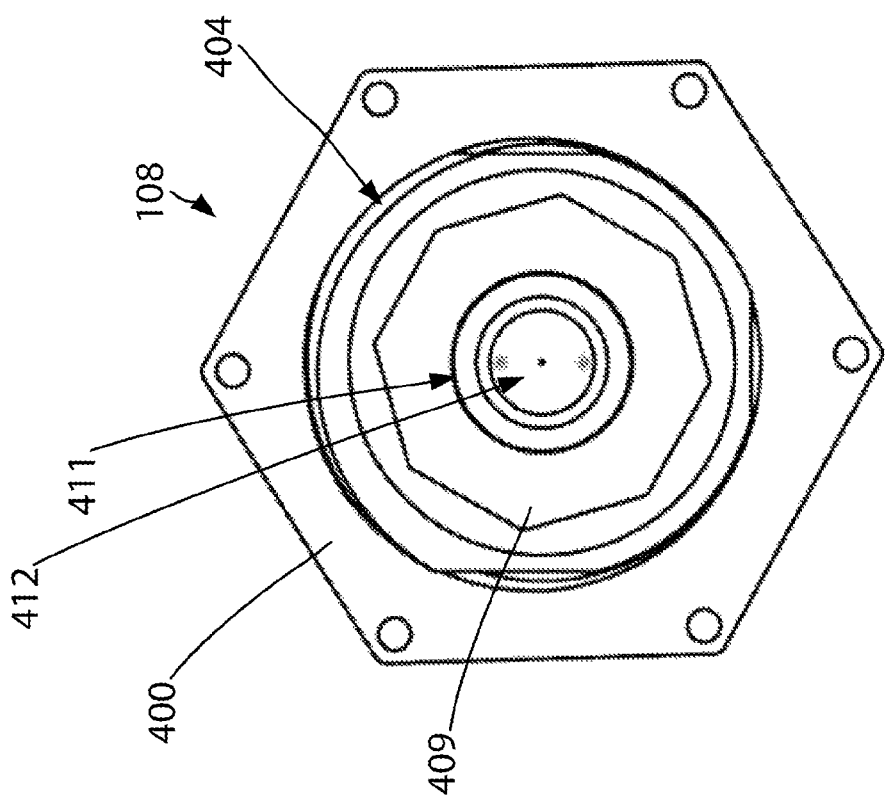
FIG. 21 is a rear view of the adjustment device shown in FIG. 19.
Figure 22:
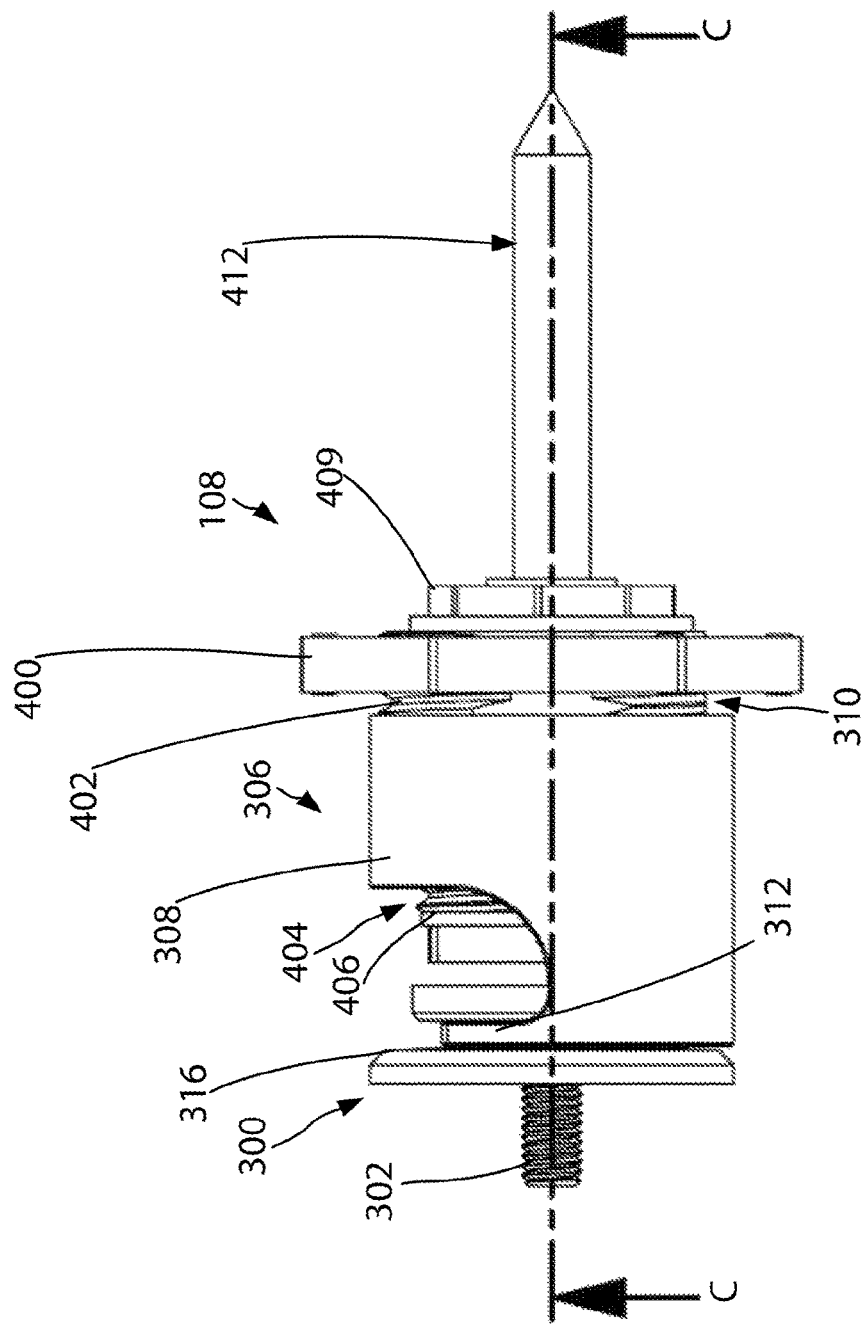
FIG. 22 is a side view of the adjustment device shown in FIG. 19.
Figure 23:
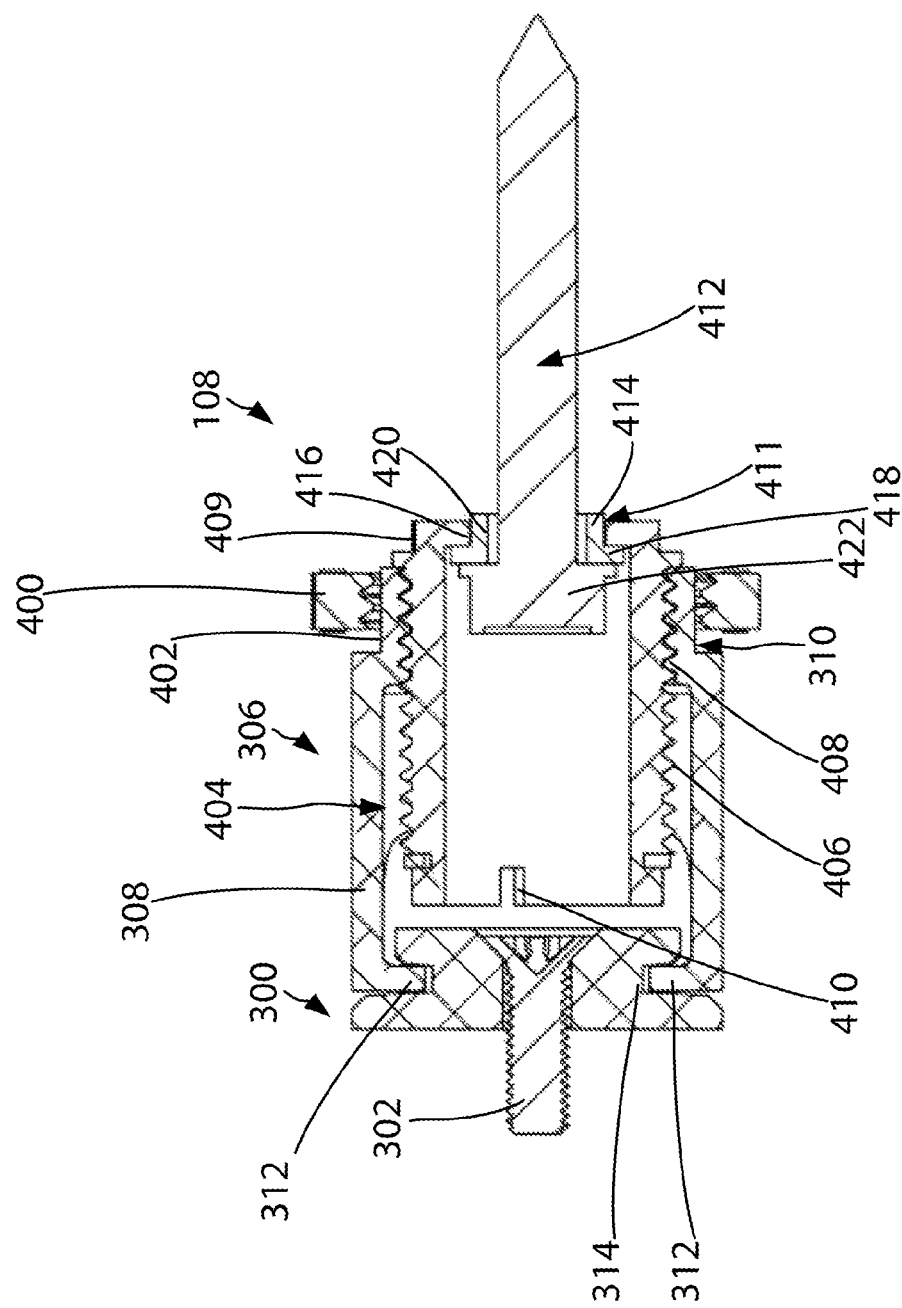
FIG. 23 is a cross-sectional view of the adjustment device shown in FIG. 22 taken along plane C-C.
Figure 24:
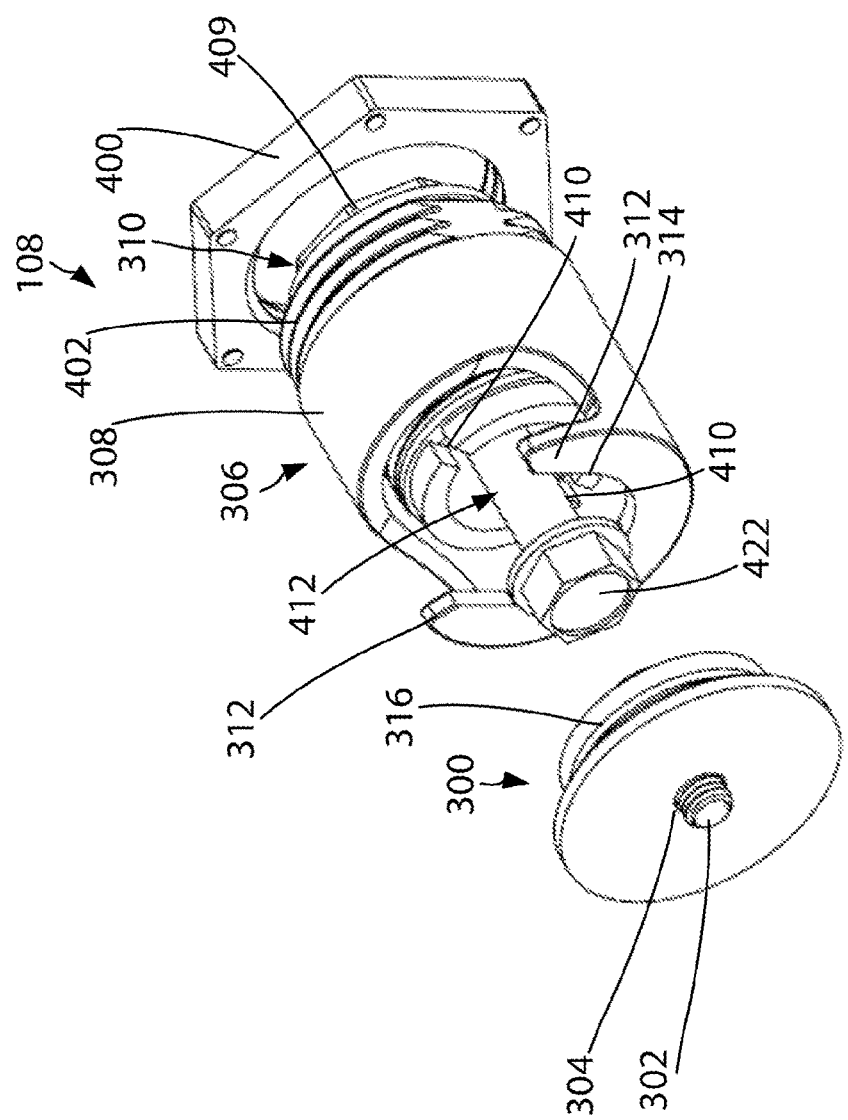
FIG. 24 is a perspective partially exploded view of the adjustment device shown in FIG. 19.
Figure 25:
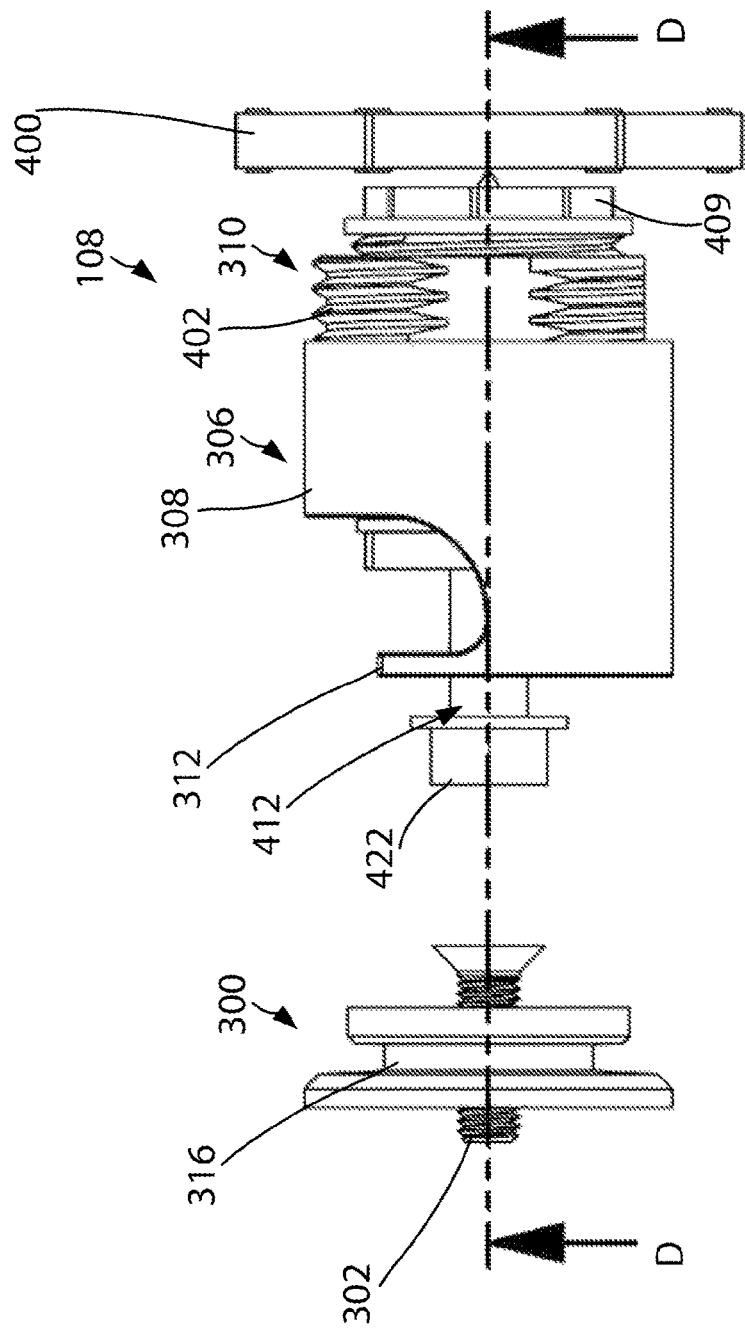
FIG. 25 is a side partially exploded view of the adjustment device shown in FIG. 19.
Figure 26:
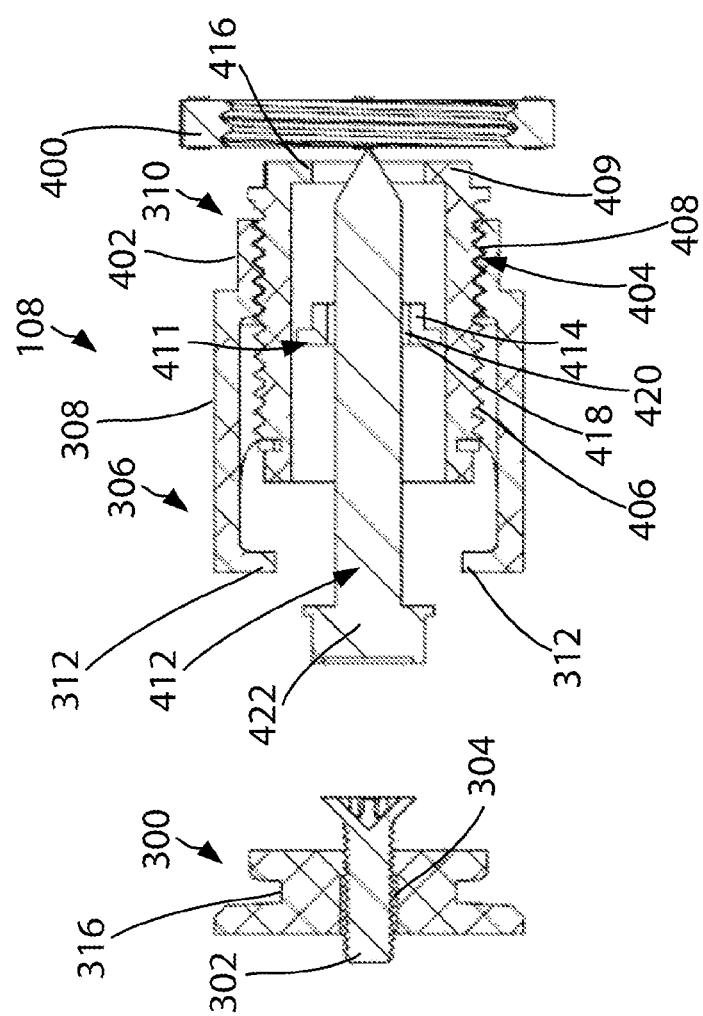
FIG. 26 is a cross-sectional view of the adjustment device shown in FIG. 25 taken along plane D-D.

Referring to FIG. 18, the adjustment devices 108 include one or more horizontal alignment slots 1800 (e.g., apertures, openings, windows, etc.) formed in the body 306. The body 306 is configured such that each of the horizontal alignment slots 1800 is aligned with one of the horizontal alignment holes 1700 when the body 306 is coupled to the plate 106.

To horizontally align the adjustment devices 108, the flexible line 1602 (is attached (e.g., tied, etc.) to one of the horizontal alignment holes 1700 on a lateral one of the plates 106. The plates 106 are then repositioned relative to the surface 104 until the flexible line 1602 is received within one of the horizontal alignment slot 1800 of a first adjustment device 108 that is coupled to a first of the plates 106 and the horizontal alignment slot 1800 of a second adjustment device 108 that is coupled to a second of the plates 106. As a result, the first and second adjustment devices 108, and therefore the first and second plates 106, are horizontally aligned. The plates 106 may then be secured to the surface 104 (e.g., if not vertical alignment is needed, if vertical alignment has been performed, etc.).

FIGS. 19-26 illustrate an alternative adjustment device 108 according to various embodiments. The adjustment device 108 of FIGS. 19-26 is similar in many respects to that shown in FIGS. 6-13, and like numbering is used for like components. In the embodiments of FIGS. 19-26, the body 306 is generally cylindrical. Additionally, the retainer flange 418 separates the surface fastener head 422 from the sleeve 404. In this way, the retainer 411 functions as a washer (e.g., hat washer, etc.).

III. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The term "coupled" and the like, as used herein, mean the joining of two components directly or indirectly to one another. Such joining may be stationary (e.g., permanent) or movable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. A display panel mounting system comprising:
a plate comprising a plate opening, a first vertical alignment hole, and a second vertical alignment hole that is aligned with the first vertical alignment hole; and
an adjustment device comprising:
a body comprising a receiver, the body configured to be received within the plate opening; a sleeve received within the body;
a coupler comprising a slot that receives the receiver such that the coupler is coupled to the body; and
a nut coupled to the body such that the sleeve is repositionable within the body when the nut is coupled to the body,
wherein the body further comprises a vertical alignment slot that is configured to be aligned with the first vertical alignment hole and the second vertical alignment hole when the body is received within the plate opening.

2. The display panel mounting system of claim 1, wherein:
the plate further comprises:
a first horizontal alignment hole; and
a second horizontal alignment hole that is aligned with the first horizontal alignment hole; and
the body further comprises a horizontal alignment slot that is configured to be aligned with the first horizontal alignment hole and the second horizontal alignment hole when the body is received within the plate opening.

3. The display panel mounting system of claim 2, wherein the body is configured such that the vertical alignment slot is configured to be aligned with the first vertical alignment hole and the second vertical alignment hole when the horizontal alignment slot is aligned with the first horizontal alignment hole and the second horizontal alignment hole.

4. The adjustment device of claim 1, further comprising a display panel fastener that is configured to be coupled to a display panel;
wherein the sleeve comprises a sleeve opening that is centered on an axis; and
wherein the coupler comprises a coupler opening that is configured to receive the display panel fastener such that the axis extends through the display panel fastener when the display panel fastener is received within the coupler opening.

5. The adjustment device of claim 4, further comprising a surface fastener;
wherein the sleeve opening is configured to receive the surface fastener;
wherein the receiver comprises an opening;
wherein the slot is configured to be positioned in the opening such that the receiver is received within the slot and removed from the opening such that the receiver is removed from the slot; and
wherein the axis extends through the opening.

6. The adjustment device of claim 1, wherein the nut is repositionable relative to the body independently of the sleeve and independently of the coupler.

7. A display panel mounting system comprising: a plate comprising:
a first plate opening;
a second plate opening;
a first vertical alignment hole; and
a second vertical alignment hole that is aligned with the first vertical alignment hole;
a first adjustment device comprising:
a first coupler comprising a first slot;
a first body comprising a first receiver that is configured to be received within the first slot, the first body configured to be received within the first plate opening, and a first vertical alignment slot that is configured to be aligned with the first vertical alignment hole and the second vertical alignment hole when the first body is received within the first plate opening; and
a first sleeve received within the first body and threadably coupled to the first body; and
a second adjustment device comprising:
a second coupler comprising a second slot;
a second body comprising a second receiver that is configured to be received within the second slot, the second body configured to be received within the second plate opening, and a second vertical alignment slot that is configured to be aligned with the first vertical alignment hole and the second vertical alignment hole when the second body is received within the second plate opening; and
a second sleeve received within the second body and threadably coupled to the second body.

8. The display panel mounting system of claim 7, wherein:
the first receiver has a first opening; and
the first slot is configured to be positioned in the first opening such that the first receiver is received within the first slot and removed from the first opening such that the first receiver is removed from the first slot.

9. The display panel mounting system of claim 8, wherein:
the first adjustment device further comprises:
a display panel fastener that is configured to be coupled to a display panel; and
a surface fastener;
the first sleeve comprises a sleeve opening that is centered on an axis;
the first coupler comprises a coupler opening that is configured to receive the display panel fastener such that the axis extends through the display panel fastener when the display panel fastener is received within the coupler opening;
the sleeve opening is configured to receive the surface fastener; and
the axis extends through the first opening.

10. The display panel mounting system of claim 7, wherein: the first sleeve is selectively repositionable within the first body; and the second sleeve is selectively repositionable within the second body independently of the first sleeve.

11. The display panel mounting system of claim 7, wherein:

the first adjustment device further comprises a first nut that is threadably coupled to the first body such that the first body is disposed between the first nut and the first sleeve; and the first sleeve is repositionable within the first body when the first nut is coupled to the first body.

\* \* \* \* \*